(12) United States Patent
Hannum et al.

(10) Patent No.: US 9,563,702 B2
(45) Date of Patent: Feb. 7, 2017

(54) MEDIA CONTENT MODIFICATION AND ACCESS SYSTEM FOR INTERACTIVE ACCESS OF MEDIA CONTENT ACROSS DISPARATE NETWORK PLATFORMS

(75) Inventors: Sandi Hannum, Philadelphia, PA (US); Peter Sheedy, Huntington Valley, PA (US); Matt Wong, Palo Alto, CA (US); Bruce R. Bradley, Wayne, PA (US); James R. Albrecht, Girdwood, AK (US); Terri L. Swartz, Marlborough, MA (US)

(73) Assignee: Comcast IP Holdings I, LLC, Wilmington, DE (US)

( * ) Notice: Subject to any disclaimer, the term of this patent is extended or adjusted under 35 U.S.C. 154(b) by 636 days.

(21) Appl. No.: 12/683,232

(22) Filed: Jan. 6, 2010

(65) Prior Publication Data

US 2010/0107201 A1    Apr. 29, 2010

Related U.S. Application Data

(62) Division of application No. 11/186,175, filed on Jul. 21, 2005, now Pat. No. 7,650,361.

(60) Provisional application No. 60/590,055, filed on Jul. 21, 2004.

(51) Int. Cl.
| | |
|---|---|
| *G06F 17/30* | (2006.01) |
| *H04N 21/258* | (2011.01) |
| *H04N 21/262* | (2011.01) |
| *H04N 21/475* | (2011.01) |
| *H04N 21/482* | (2011.01) |
| *H04N 21/47* | (2011.01) |

(52) U.S. Cl.
CPC ... *G06F 17/30828* (2013.01); *G06F 17/30858* (2013.01); *H04N 21/25875* (2013.01); *H04N 21/26258* (2013.01); *H04N 21/4751* (2013.01); *H04N 21/4825* (2013.01); *H04N 21/47* (2013.01)

(58) Field of Classification Search
USPC ................................................. 707/705, 758
See application file for complete search history.

(56) References Cited

U.S. PATENT DOCUMENTS

| | | | |
|---|---|---|---|
| 5,553,281 A * | 9/1996 | Brown | G06F 17/30017 345/619 |
| 5,861,906 A | 1/1999 | Dunn et al. | |
| 6,177,931 B1 | 1/2001 | Alexander et al. | |
| 6,393,430 B1 | 5/2002 | Van Ryzin | |

(Continued)

*Primary Examiner* — Kim Nguyen
(74) *Attorney, Agent, or Firm* — Banner & Witcoff, Ltd.

(57) ABSTRACT

A media content playlist generation and access system for a video entertainment network is herein disclosed whereby a plurality of media content emanating from various disparate networks may be conglomerated into a customized list. The list may contain stored media content, which are customarily stored in the head end portion of a CATV network, media content accessible via the Internet, or yet to be aired media content. The system also provides for manipulation of the playlist from various consumer electronic display devices that are interconnected to the Internet, or the PSTN, thereby allowing further customization of the playlist at the user's convenience. Additionally, a multiple user account system is provided wherein multiple user accounts may be configured in order to allow a corresponding multiple individualized playlists, which are each customized to suit each user's tastes.

14 Claims, 22 Drawing Sheets

(56) References Cited

U.S. PATENT DOCUMENTS

| | | |
|---|---|---|
| 6,477,704 B1 | 11/2002 | Cremia |
| 6,578,049 B1 | 6/2003 | Adolph et al. |
| 6,681,230 B1 | 1/2004 | Blott et al. |
| 6,728,729 B1 | 4/2004 | Jawa et al. |
| 2001/0044797 A1 | 11/2001 | Anwar |
| 2002/0013784 A1 | 1/2002 | Swanson |
| 2002/0023096 A1 | 2/2002 | Deguchi |
| 2002/0059610 A1 | 5/2002 | Ellis |
| 2002/0091848 A1 | 7/2002 | Agresta et al. |
| 2002/0194195 A1 | 12/2002 | Fenton et al. |
| 2003/0033321 A1 | 2/2003 | Schrempp et al. |
| 2003/0050058 A1 | 3/2003 | Walsh et al. |
| 2003/0191776 A1 | 10/2003 | Obrador |
| 2004/0019612 A1 | 1/2004 | Tyra et al. |
| 2004/0027931 A1 | 2/2004 | Morita |
| 2004/0054574 A1* | 3/2004 | Kaufman ............... G06Q 30/02 705/14.56 |
| 2004/0064476 A1 | 4/2004 | Rounds |
| 2004/0091848 A1 | 5/2004 | Nemitz |
| 2004/0114605 A1 | 6/2004 | Karaoguz et al. |
| 2004/0220926 A1 | 11/2004 | Lamkin et al. |
| 2004/0225894 A1 | 11/2004 | Colvin |
| 2004/0243482 A1 | 12/2004 | Laut |
| 2005/0216855 A1* | 9/2005 | Kopra ................. G06F 17/3002 715/767 |
| 2006/0031551 A1* | 2/2006 | Agresta ............. H04N 7/17318 709/231 |
| 2008/0133576 A1* | 6/2008 | Hempleman ..... G06F 17/30038 |
| 2008/0187115 A1* | 8/2008 | Khedouri .......... G06F 17/30094 379/102.03 |
| 2010/0241701 A1* | 9/2010 | Lester ............... G06F 17/30029 709/203 |
| 2010/0250471 A1* | 9/2010 | Alcalde ............. G06F 17/30743 706/11 |
| 2013/0097634 A1* | 4/2013 | Jin ...................... G11B 27/034 725/34 |
| 2013/0294747 A1* | 11/2013 | Takahashi .......... H04N 21/2187 386/241 |

* cited by examiner

Wednesday, June 9, 2004

7:32 PM

Space Cowboys

Starring: Clint Eastwood, Tommy Lee Jones, Donald Sutherland, James Garner

Warner Bros., 2000

Available Until: 06/11/2004

Rated: PG-13
Run-Time: 130 minutes
Directed By: Clint Eastwood

When a retired engineer is called upon to rescue a failing satellite, he insists that his equally old teammates accompany him into space.

( ORDER NOW/ WATCH )   ( ADD TO PLAYLIST )

MEDIA CONTENT MODIFICATION AND ACCESS SYSTEM FOR INTERACTIVE ACCESS OF MEDIA CONTENT ACROSS DISPARATE NETWORK PLATFORMS

This application is a divisional application of U.S. patent application Ser. No. 11/186,175, filed Jul. 21, 2005, which claims the benefit of U.S. Provisional Application No. 60/590,055, filed on Jul. 21, 2004, the disclosures of which are hereby incorporated by reference in their entirety.

BACKGROUND TO RELATED APPLICATIONS

Field of the Invention

This invention relates generally to a playlist system for cable television distribution networks, and more particularly, to a playlist generation and modification system whereby consumer electronic display devices such as personal computers, personal digital assistants (PDAs), as well as telephonic devices may be used to modify, access, or play the contents of the playlist at the user's discretion.

Background of the Invention

Available television program offerings have grown from those provided by a relatively few aerial broadcast programming sources to over several hundred channels, which are currently available from most cable access television (CATV) providers, and digital broadcast satellite (DBS) providers. Additionally, recent technology advances in video distribution techniques have enabled the transmission of video programs that are transmitted to the consumer at a user specified time such as video on demand (VOD), near video on demand (NVOD), and other interactive television (ITV) type services. These ITV services have served to broaden the choices available to users by alleviating the necessity of viewing video programs only during the programming source's allocated time slot.

NVOD and VOD services are generally defined as a type of ITV services, wherein the user may order and view a video program directly from the convenience of their own home. Whereas NVOD provides selective distribution of video programs to users only at times designated by the CATV provider, VOD enhances the utility of NVOD by enabling view of the requested video program at virtually any user selected time. It has been claimed by some that VOD services offer a viable alternative to the conventional video store. However, in order to be competitive with video stores, which typically provide a large selection of video programming choices, VOD services must also provide a similarly broad selection of video programs in order to suit the discriminating consumer.

In addition to the wide variety of video program offerings that are now provided by the CATV provider, other disparate network platforms such as the Internet provide a large selection of media content which is useful or interesting to many consumers. This content now available via the Internet may include video programs accessible via the Internet, as well as news and weather information, e-mail, instant messaging services, and the like. Thus, it would be advantageous to provide a system for direct access of content from a video distribution network such as provided by a typical CATV provider along with Internet content, wherein said content is accessible from a single user interface such as a user's television terminal.

In order to manage the rather large selection of VOD content available with today's ITV systems, user configurable playlists have been developed that allow the user to organize a selected group of video programs in an easy to manage fashion. U.S. Pat. No. 5,861,906 to Dunn, et al. discloses one such system wherein a playlist consisting of pointers or monikers to available video programs on a head end server are stored in various different sub-directories for access by a user in an easy to retrieve manner. Playlist generation and storage systems such as this have served their purpose well, however there is no teaching or suggestion by the '906 disclosure to provide a playlist generation and storage mechanism that is capable of accessing useful content from other disparate network platforms such as is known to exist over the Internet. Moreover, there is no teaching or suggestion within the '906 disclosure to provide for the generation or modification of an existing playlist from other consumer electronic display devices within disparate network platforms such as a telephone network (PSTN), or from a personal computer, personal digital assistant (PDA), or other device that is interconnected to the Internet. Additionally, there is no teaching or suggestion within the '906 disclosure to provide a media content modification or access system wherein a consumer electronic display device may access and view the media content therein.

Means existing to facilitate and control access rights to various types of informational media are commonly termed Digital Rights Management (DRM). Current implementations of DRM include the ability to control access to varied forms of media content such as video programs, textual documents, music, books, and even eCommerce. It is important to note that the DRM standard is not only limited to the control of media in a digitized format; DRM may also be enabled to control access to digital media as well as older, legacy analog media. DRM systems provide for the purchase of media content as well as controls its use according to any licensing agreements associated with that particular media content. Thus, it would be advantageous to provide a media content modification and access system that incorporates at least one DRM system that is available to control the access of media content that is available from varied network platforms.

Therefore, what is needed" is a media content modification and access system for the organization of various types of content including video programs, and other related user services in an easily accessible manner, wherein differing types of consumer electronic display devices such as cellular telephones, Internet enabled telephones, PDAs, personal computers, gaming stations, and the like are capable of the modification and access of such a list. Additionally, these consumer electronic display devices should be able to play media content contained within the list.

SUMMARY OF THE INVENTION AND OBJECTIVES

The present invention provides a solution to these needs as well as other needs via a user modifiable video playlist for interactive modification, access, and play of media content across disparate network platforms. The playlist generally contains a customized list of media content such as video programs that is created by user from a larger list of available stored media content from the CATV network as well as from the Internet. In addition to video programs, the playlist may contain other forms of media content such as audio programs, still images, slide presentations, textual information, eMagazines, music, and the like. An audio program is considered to be a type of media content throughout this disclosure, wherein an audio program is a form of video program having no video component. Thus, a user is able to store a list of interesting video programs for view at a later time in an organized manner. The playlist contains a list of pointers to media content that are stored in the head end portion of the distribution network, as well as pointers in the form of 'uniform resource locaters' (URLs) to media content available on the Internet. Access to the playlist and associated media content comprising the playlist may be interactively accessed by a user via interaction with the user premises equipment of the CATV video distribution network such as a typical set top box. The term "media" in this disclosure is to be defined by content having a visual portion and/or an associated audio portion which cooperates together in order to create a media content which is typically viewed over a conventional display such as a television.

One aspect of the present invention is a hierarchal style user account creation means which allows multiple user accounts to be created and administered by an administrative user. Access to the playlist may be encapsulated within a login session in such a manner as to abate unwarranted access and illicit modification thereof. The user premises equipment may provide for the creation and configuration of multiple user accounts in order to accommodate the multiple users encountered in a typical home environment such as a father, mother, and one or more children. Thus, a user account may be established for each member of the household having a password that is only known by that particular user. Furthermore, specific user accounts may be established by an administrative user account in order to enact specific "parental controls" thereon.

Another aspect of the present invention is a means to manipulate, access, or play the stored media content from consumer electronic display devices having interactive capabilities that are interconnected to disparate networks such as the Internet or the public switched telephone network (PSTN). An interactive enabled consumer electronic display device is defined as any networked device having a display for prompting response from a user and an associated input means such as a keyboard, remote control device, or keypad for entry of responses thereto. Further, a network interconnected interactive consumer electronic display device allows for the transmission of a message from a distal source on the network coupled with an ensuing response to the distal source. Several devices which are known to fit this criterion include Internet coupled devices such as personal computers, laptop computers, personal digital assistants (PDAs), network enabled watches, and automated teller machines (ATMs). Similarly, telephones such as cellular telephones, or Internet enabled telephones also include means to provide interactive capabilities. Thus, the media content modifiable, accessible, or playable using user premises equipment typically associated with a conventional CATV distribution network as well as various types of network interconnected consumer electronic display devices having interactive capabilities.

Another aspect of the present invention is a playlist which is capable of accessing media content across varying disparate platforms. This cross-platform accessibility is accomplished via a playlist that contains a list of pointers to media content, each in a format that is computable with its associated network. For example, an entry in the list may contain a pointer to a video program located at the head end portion of a conventional CATV video distribution network. Alternatively, an entry in the list may contain a uniform resource locater (URL), which is capable of accessing a type of media content from the Internet. Thus, the system incorporating the playlist is capable of accessing content such as media content from across disparate network sources, thereby maximizing the number of video entertainment choices and thus the enjoyment to a user thereof.

It is therefore an object of the present invention to provide a user modifiable media content playlist for the interactive access of multi-media content across disparate network platforms, wherein said network platform may comprise a conventional CATV distribution network and/or the Internet.

Another object of the present invention is to provide a user modifiable media content playlist for interactive access of multi-media content across disparate network platforms, wherein said disparate network platform may comprise video cassette recorders (VCRs), digital versatile disks (DVDs), and digital video recorders (DVRs).

Another object of the present invention is to provide a user modifiable media content playlist which is modifiable by a conventional set top box, or any consumer electronic display device that is interconnected to either the Internet or PSTN and has interactive capabilities.

Another object of the present invention is to provide a user modifiable media content playlist which is modifiable by a telephone, an Internet enabled telephone, a smart watch, a video telephone, an ATM machine, or an Internet coupled device such as a personal computer, laptop computer, or PDA.

Another object of the present invention is to provide a user modifiable media content playlist which is encapsulated in a user account, wherein access to said user account is protected from unsolicited access or modification thereof via an authentication scheme.

Another object of the present invention is to provide a plurality of media content which are each encapsulated in a user account, wherein access to each said user account is protected from unsolicited access or modification thereof via an authentication scheme.

These and other objects of the present invention will become readily apparent to those familiar with video distribution network topologies and will become apparent in the following portions of the specification, wherein the detailed description is for the purpose of fully disclosing preferred embodiments of the invention without placing limitations thereon.

BRIEF DESCRIPTION OF THE DRAWINGS

For a further understanding of the nature and objectives of the present invention, reference should be made to the following detailed description, taken in conjunction with the accompanying drawings, in which like elements are given the same or analogous reference numbers wherein.

DETAILED DESCRIPTION OF THE PREFERRED EMBODIMENTS

Figure 1:
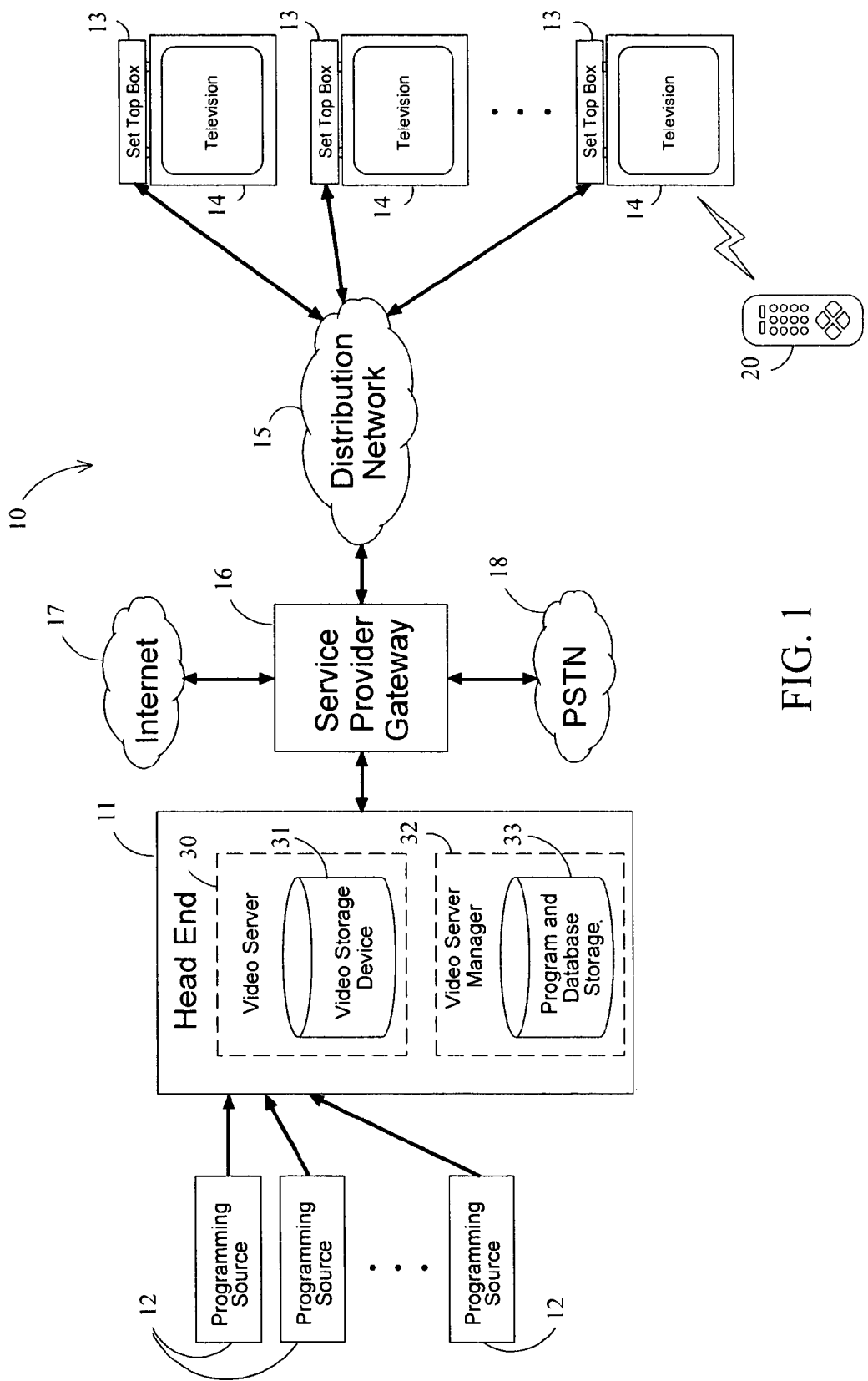
FIG. 1 is a block diagram of some of the principle components of the video distribution system of the present invention

Referring now to the drawings, FIG. 1 shows a diagrammatic representation of an exemplary interactive television (ITV) enabled video distribution network 10 according to the present invention. The ITV enabled network generally comprises a head end 11 which processes broadcast video programs and other media content emanating from a plurality of programming sources 12 and forwards these video programs onward to a typical set top box (STB) via a service provider gateway 16. Each STB 13 is operable to control what media content are shown on their associated display 14 such as a conventional television, and outputs commonly used NTSC, PAL, or SECAM formatted signals to the television set. The distribution network 15 is typically comprised of a lattice of coaxial cable lines or hybrid-fiber-cable (HFC) for connectivity of the head end to the plurality of STBs in the network, and may also include a plurality of broadcast centers or nodes that each service a subset of STBs within a small demographic area.

An interactive television (ITV) enabled network is defined as the ability of a head end to receive and process upstream requests from a distally located customer premises equipment such as a conventional set top box (STB) 13 in order to manipulate media content which is sent downstream to the STB corresponding to those requests. Given this criterion, television entertainment distribution systems utilizing satellite transmissions, which are commonly referred to as direct broadcast satellite (DBS), may incorporate ITV capabilities via use of out-of-band signaling methods made possible through the public switched telephone network (PSTN), or other similar upstream signaling mechanism. Accordingly, it is to be appreciated that the principles and teachings of the present invention are applicable to any video distribution system having ITV capabilities including those which have been described hereinabove.

Although not by way of limitation, the head end may communicate with the STB using a predetermined packetized protocol such as one version of the Data Over Cable Service Interface Specification (DOCSIS). The DOCSIS protocol provides enhanced support for CATV transports (video transmission), Internet connectivity, as well as connection to the public switched telephone network (PSTN). Moreover, the DOCSIS protocol provides for interconnectivity to virtually any type of data network; thus the term "Internet" shall be construed in a broad sense throughout this disclosure to include any public or private network such as a virtual private network (VPN), which is capable of conveying data to and from the DOCSIS enabled ITV system. Transmission of video programming is preferably accomplished by encapsulating a version of motion picture experts group (MPEG) packets within an Internet protocol (IP) frame via service provider gateway 16, wherein the MPEG type packetized architecture is a form of digitized video compression protocol suitable for the transmission of media content. Connectivity of the STB to the Internet 17 is provided by gateway 16 using the IP protocol. Thus, the STB is enabled to issue requests directly to any Internet coupled device or server on the Internet. Messaging to individual telephones over the PSTN 18 is also enabled from the STB by gateway 16.

A user interface may be accomplished in the ITV enabled network system via a remote control device 20, which transmits individual keystroke commands via infrared (IR), Radio Frequency (RF), or other aerially transmittable, modulated signals to the STB. However, it is to be appreciated that the user interface may also be accomplished via a personal computer or other similar type device having a user input means such as a keyboard, which is interconnected to the network, preferably at the STB. Upstream signaling of user requests are typically provided in a video distribution network via a conventional type of system commonly referred to as a navigator. The navigator is preferably a micro-processor driven algorithm which is executed by a plurality of stored program instructions located either in the head end or STB. Among other services, the navigator provides a means of handling human interaction with the network in a preferably ergonomic manner, and processes requests from the user to the upstream server or head end. The navigator is preferably a micro-processor driven algorithm which is executed by a plurality of stored program instructions located either in the head end or STB. Alternatively, the navigator may operate in a server-client mode wherein processing of user requests are shared between the head end and STB.

Figure 2:
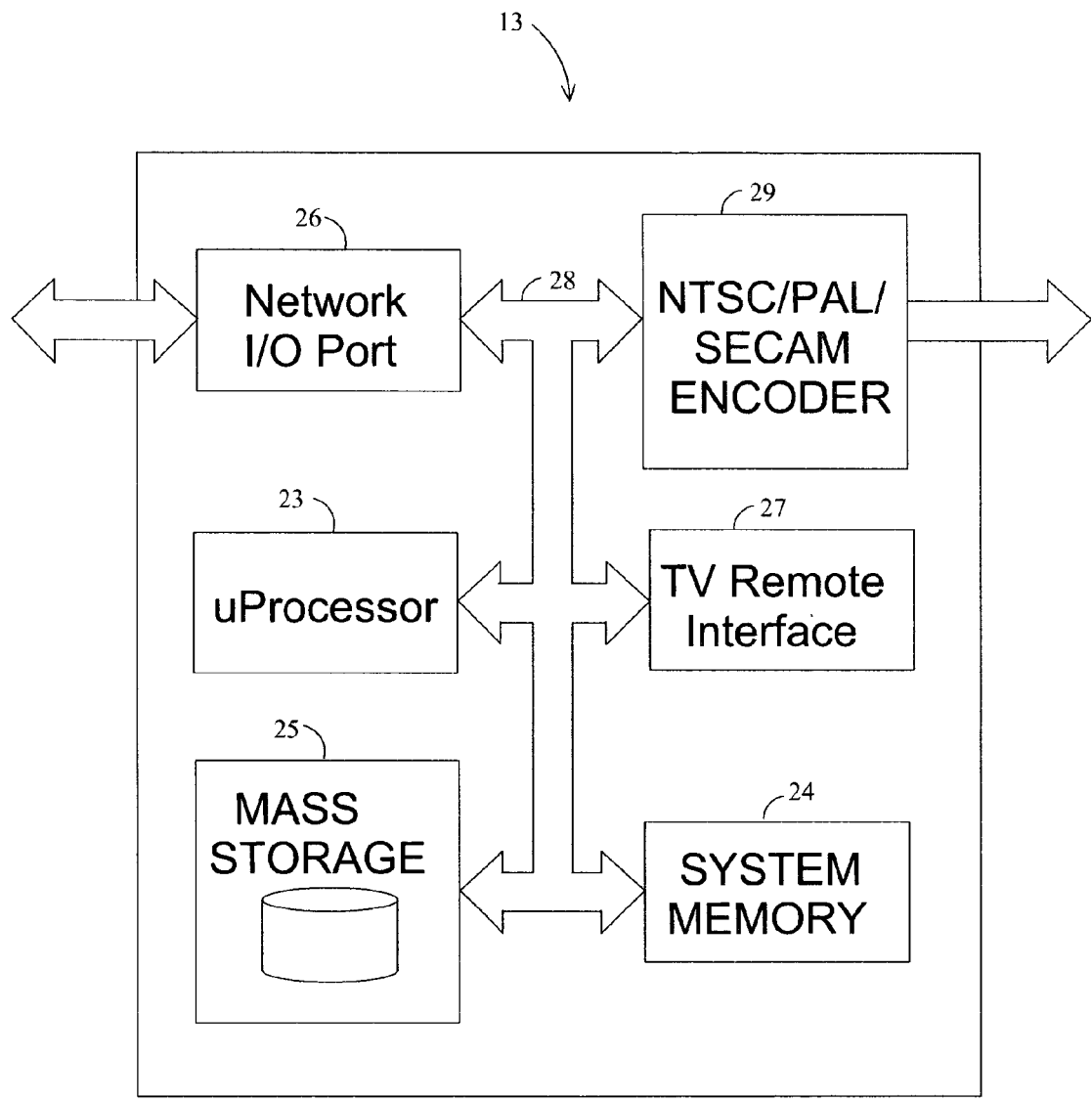
FIG. 2 is a block diagram of the set top box of the present invention.

FIG. 2 shows a generic diagrammatic view of the STB 13. The STB generally comprises a programmable micro-processor 23, non-volatile Read Only Memory (ROM) and volatile Random Access Memory (RAM) comprising the system memory 24, optional mass storage 25, a network interface 26, and remote control device interface circuit 27, which are all interconnected together via multi-conductor bus 28. The network interface 26 decodes digital streaming media content from the head end 11 and forwards this media content to the NTSC/PAL/SECAM encoder 29. The network interface 26 is also responsive to processor 23 in order to request and receive media content from the gateway 16, remote devices that are connected to the Internet 17, and telephony devices over the PSTN 18. The ROM contains executable programming instructions that are perennially persistent and serve to bootstrap the STB directly after initial power on. The RAM contains volatile memory which may be populated with various executable instructions that may be served from a conventional carousel (not shown) resident within the head end 11. An optional mass storage device 25 is also included for the non-volatile storage of user modifiable media content within the STB 13. The mass storage device 25 may be comprised of a magnetic or optical disk, electrically erasable programmable read only memory (EE-PROM), battery backed-up RAM, or any other similar mechanism that enables the non-volatile storage of microprocessor readable data, wherein the data stored in said mass storage device 25 is easily modified by the micro-processor 23 during use. The aforedescribed STB may exist as a dedicated unit or a box that is adapted for placement proximate a conventional display or form an integral part of a display such that the components (23, 24, 25, 26, 27, 28, and 29) exist within the enclosure of the display 14. Additionally, it is contemplated that the components (23, 24, 25, 26, 27, 28, and 29) may also form an integral part of other components such as a Personal Video Recorder (PVR), personal computer, or similar type device. Thus, the STB together with other associated video entertainment equipment such as televisions, PVRs, or personal computers comprise a type of customer premises equipment that may be utilized with the present invention.

The head end 11 of the ITV enabled system may include a video server 30, which is capable of storing a plurality of video programs for view at a user specified time. The server 30 is operable to process multiple incoming requests from a plurality of users at the same time, and delegates the necessary bandwidth for a requested stored video program for transmission to the user, wherein such a service that is provided to the user is commonly referred to as Video-On-Demand (VoD). In order to facilitate storage requirements for such a system, a video storage device 31 is included therein, which may consists of one or an array of magnetic, optical disks, or servers based on RAM technology. Additionally, a video server manager 32 is also included that controls access to content stored in the video server 30 and has an associated program and database storage 33, which houses user information, stored executable programs, or other fields of information that are used by the ITV system.

The playlist generation and access system of the present invention preferably comprises a controller which is operable to receive and process user requests from a plurality of user interface devices for manipulation of the playlist. The controller is generally a set of executable codes that are generated in any suitable computer language such as C, C++, or the like, and compiled into a sequence of machine codes that is readable by the micro-processor 23, or video server manager 32. That is, the controller may exist, and execute from the head end 11, from the STB 13, or from both head end and STB in a distributed processing approach such that the controller operates in a client-server type model. Alternatively, the STB 13 may form an integral part of a conventional personal computer, wherein the plurality of executable codes are stored on a resident mass storage device and are executable on a micro-processor therewithin.

User interaction with the system of the present invention is preferably accomplished via a remote control device 20 for input of individual keystrokes, in conjunction with a display such as a television that provides the user with visual feedback in the form of a graphical user interface (GUI). The GUI generally comprises a plurality of screens, each having a plurality of actuatable buttons which may be alternatively actuated by the user. Each button may be alternatively actuated in a conventional manner by pressing the "up", "down", "left", or "right" cursor movement buttons in order to highlight a particular button or region and then subsequently pressing an "OK" button or other button that is adapted for requesting action of the presently highlighted cell by the user on the remote control device 20. Alternatively, specific buttons on the remote device 20 may be provided, which are dedicated to the actuation of a particular option button. Nevertheless, it is to be understood that the foregoing example is merely an exemplary configuration of a suitable user interface; other user interfaces are well known in the art and thus may be substituted accordingly without deviating from the spirit or scope of the present invention, such a personal computer having a keyboard for user input.

Figures 3, 4:
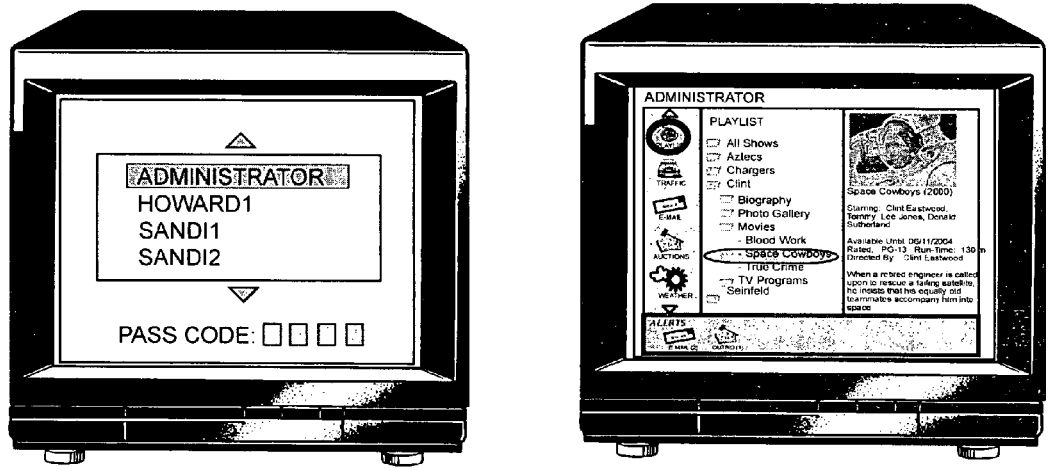
FIGS. 3-5 are front elevational views of a conventional television showing an exemplary login procedure in accordance with the present invention.

FIG. 3 shows an exemplary log-in access means for entering the playlist generation and access system, wherein a log-in screen is shown following STB bootstrap of microprocessor 23 or following a log-out of any configured user (to be hereinafter explained). As shown, several active usernames are shown in a username window 40, wherein one username may be alternatively highlighted by alternatively pressing the "up", or "down" button on the remote control device 20. In order to secure access to each user account to only those users that are authorized to access that user account, an authentication scheme is provided with the present invention. The authentication scheme may be provided by any means that controls access to only pre-approved users such as pass-code/password entry, or other similar security type systems. The exemplary means of providing an authentication scheme of the present invention is via a pass-code that has four boxes 41 that alternatively become highlighted during entry of a pass-code by the user. The requirement of the pass-code insures that only the prespecified user is allowed to view and/or modify the playlist or other features contained within the user account. As shown in the exemplary example a four-digit pass-code is required in order to access the features of the user's account, however, it is to be understood that any number of digits may be implemented with the present invention. Preferably, the pass-code 41 is any multiple sequence of numerals which are selected by proper depression of corresponding numeric keypad of the remote control device. Once a proper username and associated authentication scheme is entered by a prospective user, a screen is generated by the controller on the display as shown in FIG. 5.

Figure 5:
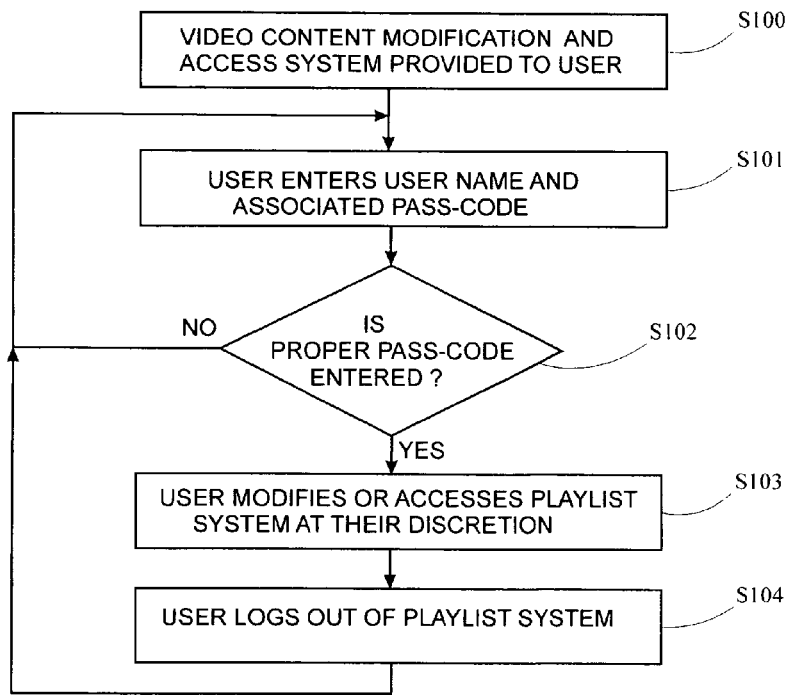

Illustrative steps involved in providing a user account system for a media content modification and access system of the present invention are shown in FIG. 5. Initially, the media content modification and access system may be provided to the user via a log-in screen (step 100). The user may respond by selecting a username from the available list of active usernames followed by entry of an authentication scheme (step 101). The system then compares the a stored username and associated authentication scheme, which is stored in either the program and database storage 33 or mass storage 25, with the username and authentication scheme entered by the user (step 102). If the user entered username and authentication scheme do not identically match the stored values, the log-in screen 40 is merely regenerated on the display for the user to make a second attempt. However, if the entered username and authentication scheme match the stored values, a user session is begun wherein the user may access and modify various provisions of the media content modification and access system (step 103). When use of the system has been completed, the user may log-out of the system utilizing a log-out means; (described herein below) thereby allowing another user to access the system (step 104). It is to be appreciated the aforedescribed user account log-in system describes only one example of many different means of establishing, working within, and then exiting from a system having multiple user accounts. For example, a prompt that is generated on the display during log-in for the purpose of providing the user with hints should the authentication scheme be inadvertently forgotten, would fall within the spirit and scope of the present invention.

Figure 6:
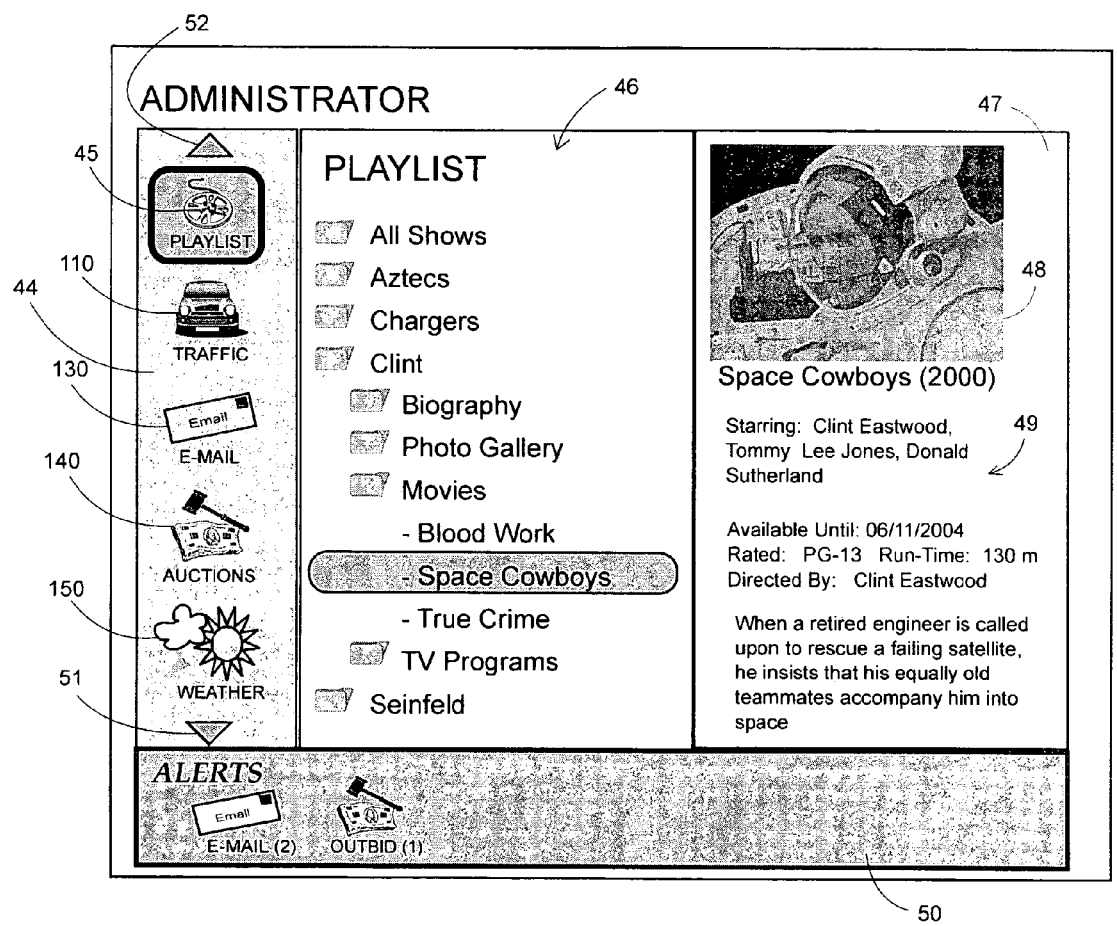
FIG. 6 is an exemplary illustration showing the resultant screen view upon actuation of the 'PLAYLIST' service icon.

An enlarged view of the screen of FIG. 5 is shown in FIG. 6, wherein a temporary user session is currently active. It is noted that all further pictorial representations of screens shown on the display will be shown without the associated enclosure thereof for the purpose of clarity of disclosure. In the exemplary disclosure, the administrator user account has been chosen by a user. The left most column defining a services selection column 44, of the home screen contains a plurality of actuatable service icons corresponding to varying services (to be described hereinafter) provided by the system. Following initial log-in into the user account, the 'PLAYLIST' service icon 45 is automatically actuated thereby generating two columns of information to the user. The column immediately disposed to the right of the services selection column is a directory column 46 providing a directory view of all media content contained in the playlist, wherein the right-most column defining a detailed information column 47 may contain specific information regarding each piece of media content in the playlist. Each media content shown in the playlist may contain pointers to video programs, video trailers, special video clips, video content that may have been purchased by the user; or interesting photographs particular to a given subject. As shown, a particular entry in the playlist entitled 'Space Cowboys' has been highlighted. Thus, in response, the system may generate a detailed view of the selected media content using a graphical image 48, and associated textual information 49 about the media content. Underneath the services selection column 44, the directory column 46, and detailed information column 47, is an alertment column 50 which provides special alarm or alert messages in addition to messages that may have been received from another user via the instant messaging service.

Figure 7:
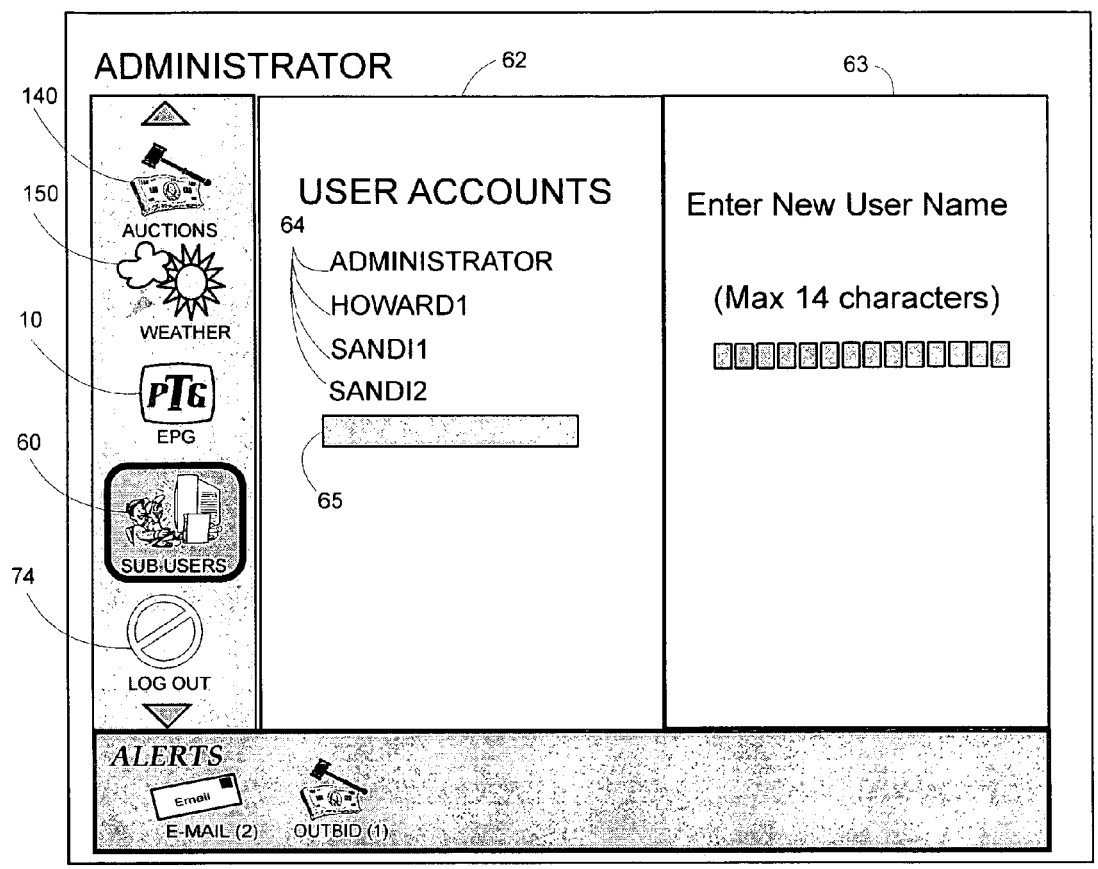
FIGS. 7-9 are exemplary screen illustrations showing the interactive features of the user account portion of the present invention.

Additional actuatable buttons defining service icons are made available to the user by actuating the upwards scroll icon 51 in the services selection column, which serves to scroll the vertically aligned list of service icons upwards in order to display other icons disposed therebeneath. A complimentary downwards scroll icon 52 is also provided that enables the vertically aligned list of service icons to be scrolled downwards on the screen. FIG. 7 shows other service icons which are available to the user following actuation of the upwards scroll icon 51.

The playlist generation and access system provides for the creation of multiple user accounts in order to accommodate multiple users of a household, each having their own personal preferences. For example, the father of a household may wish to store video programming information pertinent to his personal tastes, whereas the mother may have interests that involve a totally different genre of video programming. The multiple user account feature of the present invention provides a solution to this need by allowing each user to populate a playlist specific to each account with media content that are suited to the instant user's tastes. Moreover, parental control mechanisms may be employed from the administrative account to individual user accounts in order to "lock out" certain forms of questionable or controversial media content from use thereby. In order to facilitate this feature, a 'SUB USERS' service icon 60 is provided as an actuatable button within the administrator user account. The 'SUB USERS' service icon provides a means of adding, and deleting sub-users to the system as well as provides a means of manipulating various sub-user privileges within the playlist system. As shown in FIG. 7, two columns comprising a user account column 62, and a user account information column 63 is generated on the display in response to actuation of the 'SUB USERS' service icon 60. The user account column 62 displays a list of users 64 that presently exist on the system, wherein configuration information relating thereto is accessed by scrolling a highlighting box 65 downwards/upwards until the desired user is highlighted thereby followed by pressing the 'OK' button or other equivalent button on the remote control device 20. Nevertheless, FIG. 7 depicts the highlighting box 65 scrolled to position on the screen directly below the last presently configured user, wherein means are provided in the account information column 63 to add an additional user to the system. It is important to note that the 'SUB USERS' service icons only provided during the administrator log-in session; that is, other users will not have access to the features provided by the 'SUB USERS' service icon.

Figure 8:
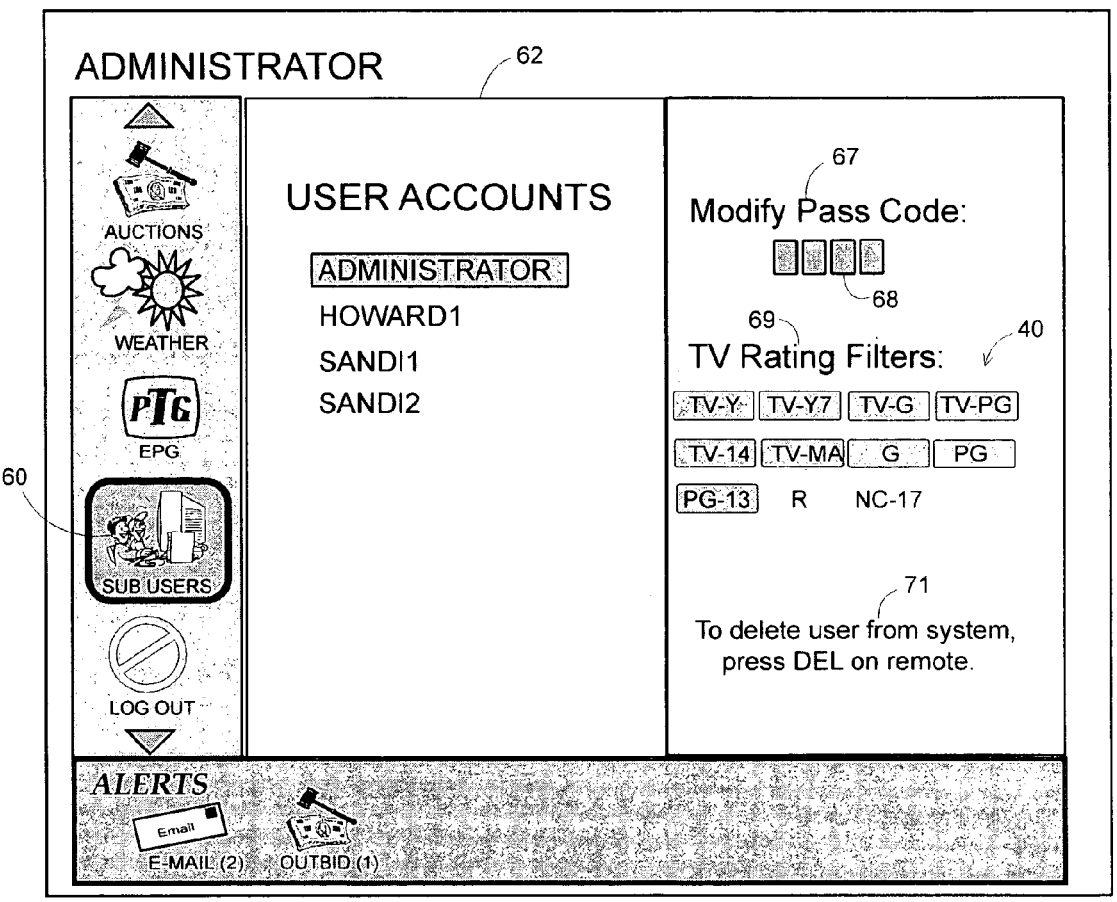

If configuration of an existing user is desired, the highlighted box 65 may be moved via successively pressing the "up" key on the remote control device 20, over an existing user as best shown in FIG. 8, wherein the highlighted box is overlaid upon the 'Administrator' user. While the box 65 is overlaid upon an existing user, the user account information column 63 displays various types of configuration information, which is modifiable by the user. One type of configuration information provided to the user is a authentication scheme modification portion having a prompt 67 and a plurality of actuatable fields 68 disposed therebeneath. Each field 68 may correspond to a numeral which is modifiable in order to set a pass-code that is preferably only known by the administrative user. Beneath the pass-code modification portion is a TV Ratings portion that provides for filtering of media content that is to be added to the playlist or what is displayed on the Electronic Programming Guide (EPG) screen. The TV Rating portion essentially comprises a 'TV Ratings Filter' prompt 69 in conjunction with a plurality of actuatable radio buttons defining TV ratings buttons 70 specifying the types of programming that is to be allowed for storage or display with the current user's account. The types of TV ratings that the administrator may allocate to any particular sub-use is cumulative, that is, multiple different TV ratings may simultaneously be allocated at one time. The selected TV ratings criterion may work in conjunction with parental control mechanisms which are commonly known with modem EPGs and/or their associated VOD offerings. Thus, if the administrative user selects only TV-Y, TV-Y7, TV-G, TV-PO, and TV-14 TV ratings for a particular username, a user that is logged-in under that username will not be able to view content from the EPO, or its associated VOD offerings having TV-MA, G, PG, PG-13, R, or NC-17 ratings.

Disposed beneath the TV ratings portion is a user account deletion prompt 71 which informs the user of a proper sequence for deleting the user account from the system. The administrator user account is perennially persistent within the system and thus may not be deleted by the administrator user; however the MSO may have authorization to delete or modify the administrator user. Thus the user account deletion prompt 71 is partially grayed-out in order to form an indication to the user that deletion of the administrator user is not possible. However, the user account deletion prompt may be generated on the screen in standard textual format, when accessing configuration information for other subusers in order to indicate that deletion of the instant sub-user is available. Although the foregoing description has disclosed several configuration options available to the 'Administrator' user account, it is to be understood that similar configuration options are available to other subusers existing within the system, the only exception being that a sub-user may not access or modify any parameter within the administrator user account. Additionally, it will be appreciated by those skilled in the art that other user account configuration options may also be available with the present invention without deviating from the spirit and scope of the invention.

Figure 9:
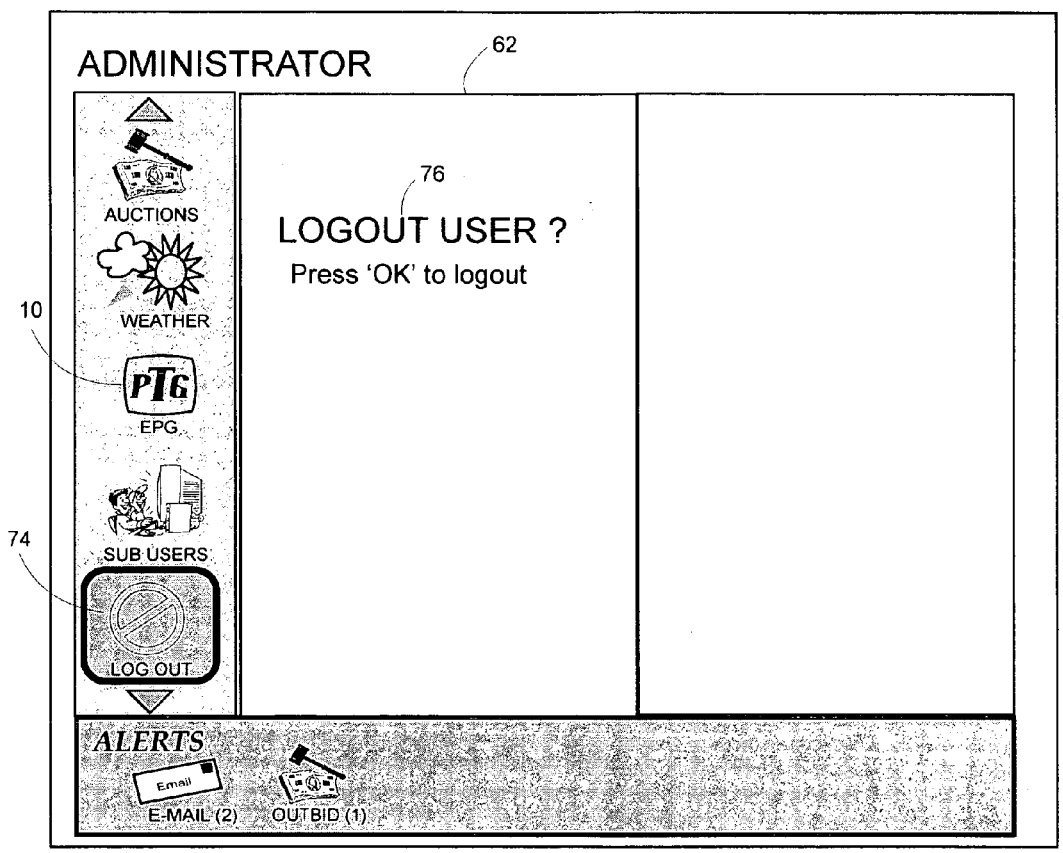

Means are provided to allow a log-out of the present user via a 'LOG OUT' actuatable service button 74 located in the services selection column 44. Actuation of the 'LOG OUT' button 74 by a user causes the present user session to be terminated thus disallowing further access or modification of the playlist or other confirmation options associated therewith. FIG. 9 shows an exemplary log-out screen having a log-out prompt 76 that indicates a proper sequence of buttons to be pressed on the remote control device 20 in order to request log-out of the present user account. Subsequent to log-out, the screen as shown in FIG. 3 is generated on the display, thus allowing another existing user to log-on to the system.

Figure 10:
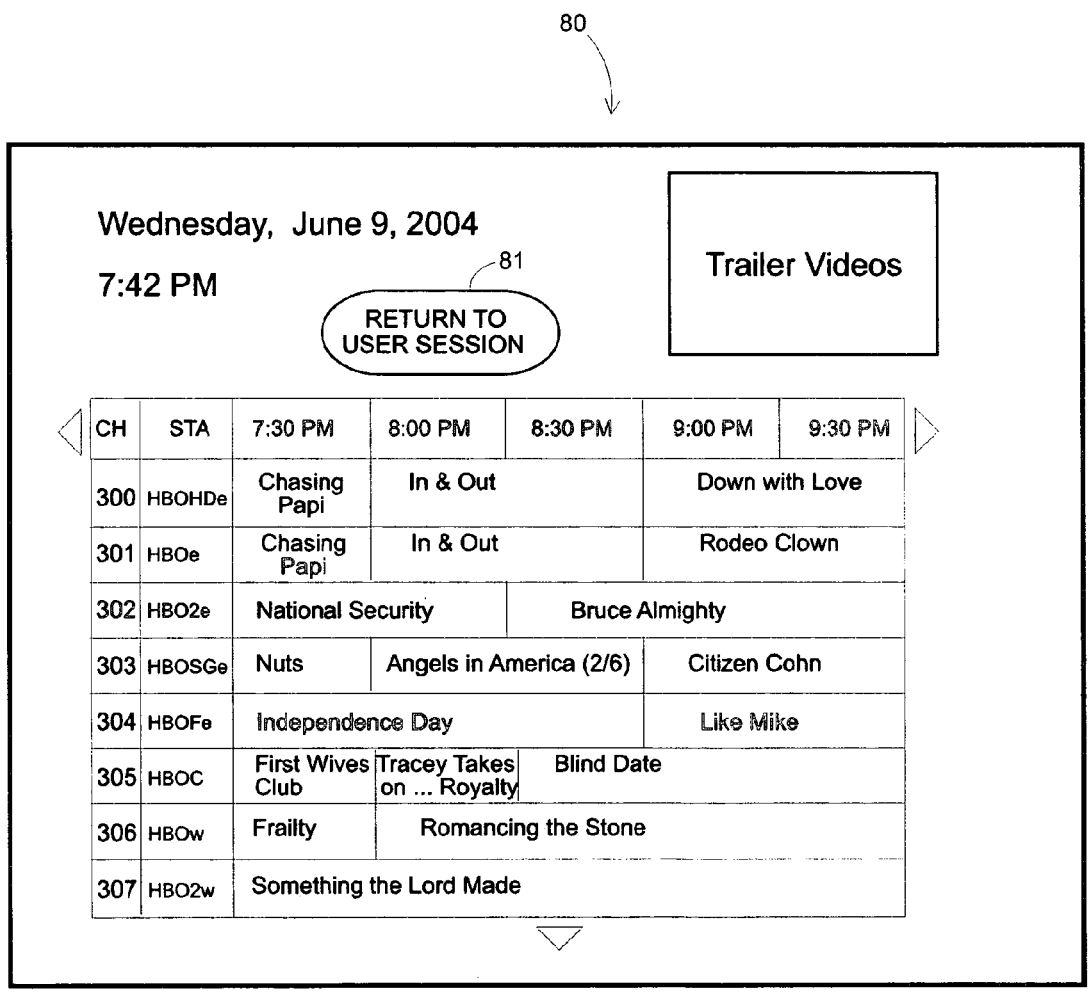
FIG. 10 is an exemplary illustration showing the resultant screen view upon to actuation of the 'EPG' service icon.

Media content may be added/deleted from the playlist in a number of different ways. One means of adding an entry to the playlist is from a conventional EPG screen as shown in FIG. 10. The EPG screen is generated by the controller in response to the user's pressing of the EPG icon 60 located in the services selection column 50. The configuration and operation of the EPG is similar to known EPG implementations, but is different from conventional EPGs in that means are provided thereto for adding media content pointers to the user's playlist. The exemplary EPG screen 80 is shown having a grid-like display of eight rows depicting the programming schedules for eight associated programming sources. Each row has a multiple of cells of varying length, wherein the first two cells of the leftmost column contains information regarding the channel and name of the programming source respectively. Successive cells indicate individual programs that are aligned vertically according to their respective time slots. Currently aired video programs are selected for immediate view from the EPG screen in the normal manner via movement of a highlighted cursor corresponding to a particular cell using the cursor movement buttons. Alternatively, video programs to be aired at a future time may be added to the playlist. A future aired program is added to the playlist by storing a title, channel, and time/date information as a pointer therein. Thus, the user may select a yet to be aired video program to be added to the playlist, wherein FIG. 10 shows an exemplary video program entitled "Down With Love" which is to be aired in the future. If the user selects this video program, an alert message will be stored in the playlist such that an alertment means may be sent to the user shortly before the prescribed air-time of the video program. This alertment means may comprise an visual/audible message sent to the display approximately 2 to 30 minutes prior to air-time, an e-mail message, or a recordation command that is automatically sent to a video recording device such that the video program may automatically recorded for view at a later time. Preferably, a dedicated button on the remote control device 20 may be pressed by a user if addition to the playlist is desired. An actuatable button 81 is also overlaid on the EPG screen in order to allow the user to access the interactive functions of the user session. Pressing button 81 causes the system to generate the playlist display screen as shown in FIG. 5 from which other interactive functions of the system may be accessed.

Figure 11:
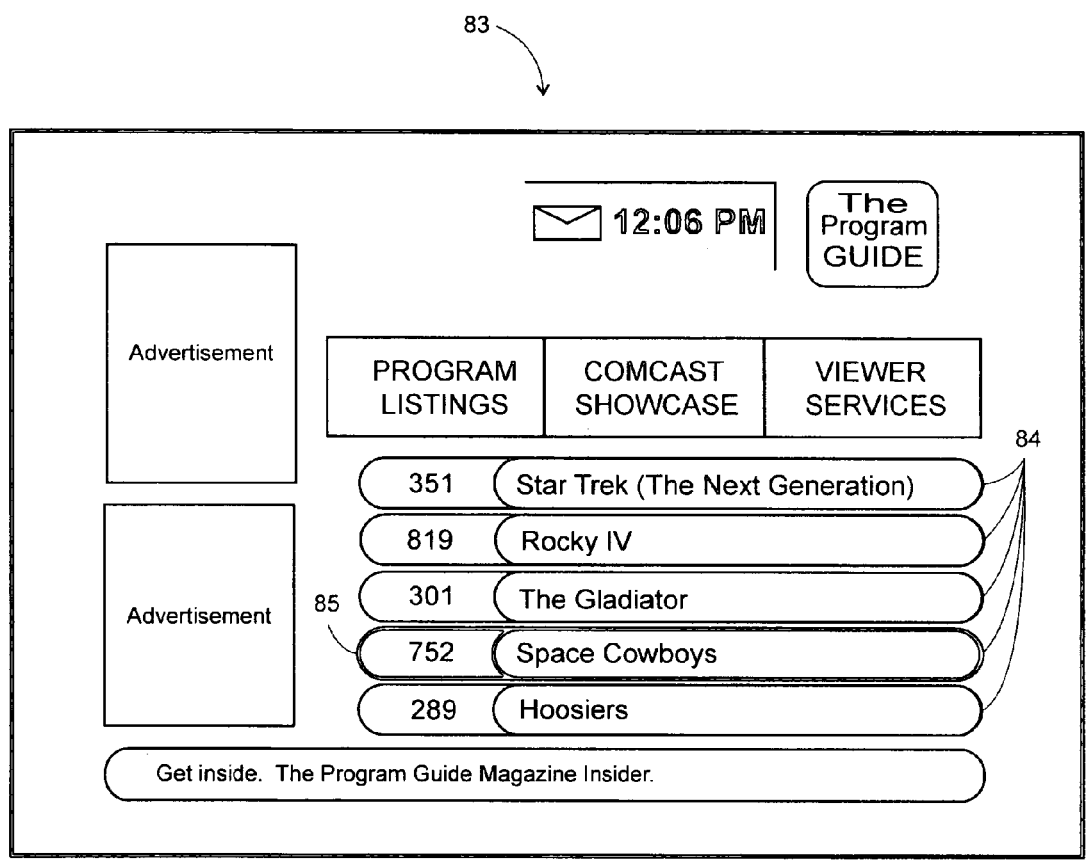
FIG. 11 is an exemplary illustration showing the VOD mode screen of the present invention.
Figure 12:
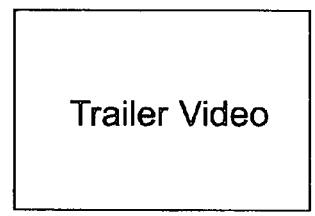
FIG. 12 is an exemplary illustration showing the detailed information screen of the present invention.

The user may also select media content such as stored video programs for placement into the playlist. These stored video programs may include VOD, or NVOD assets administered by the CATV provider using conventional DRM techniques, wherein Pay-Per-View™ video programs offer one example of a DRM technique. VOD assets may be accessed by any conventional means; preferably, the VOD assets are accessed by selecting a prespecified channel of the EPG in order to enter the VOD mode of the network. FIG. 11 shows an exemplary VOD mode screen 83 wherein a plurality of video programs 84 are shown that comprise a subset of all video programs that' are available for view. Access to a particular video program on the display is accomplished by scrolling a highlighted region 85 upwards, or downwards using the "up", or "down" arrow keys respectively of the remote control device 20, wherein a particular video program entitled "Space Cowboys" is shown to be highlighted. If the "OK" button or other equivalent button is pressed, a detailed information screen 86 is generated that provides detailed information regarding the highlighted stored video program. FIG. 12 shows an exemplary detailed information screen 86, corresponding to the highlighted video asset. The highlighted video program may be selected for immediate view by pressing actuatable button 87, or may be placed in the playlist by pressing an actuatable button 88. Additionally, means may be provided to automatically debit the user's account and inform the user of current account status. Thus, if button 87 is pressed, the system immediately accesses the video program from storage and begins play of the selected video program. However, if the button 88 is pressed by the user, a pointer that is associated with the video program is stored in the playlist.

A filter or search system may be implemented with the aforedescribed EPG and VOD access screens in order to enable the user to quickly find an interesting program. A commonly owned, and copending application entitled "Interactive Media Content Search System For Media Content Listing Display Systems such As an Electronic Programming Guide", which discloses means to provide apply a filtering or searching system for EPGs, VOD media: content, PVR media content, peer-to-peer (P2P) media content, or files residing on a personal computer, is incorporated by reference in its entirety. Thus given the present disclosure, the user would be able to sift through a plethora of available media content from across multiple disparate network platforms for placement into the playlist.

It is important to note that the media content per se, is not stored in the playlist, rather a pointer is stored therein that is readable by the controller for accessing the media content from a distally located medium such as the mass storage device 31 in the head end. For example, a pointer to a type of media content existing on the Internet will be stored in the playlist as a URL. A pointer to a yet to be aired video program existing on the EPG will be stored in the playlist with tags associating the title of the video program, the channel from which the program will air, and the date/time thereof. This combination channel, date/time information may be used to send an on-screen alert to the user shortly prior to air time, or may be set to automatically cause a DVR type of equipment to record the program using commonly known automatic DVR recording techniques. A pointer to a video program existing on the mass storage device 31 or within the EPG may be stored in the playlist using any unique identifier which is known to the video entertainment system distribution network.

Currently, most digital cable distribution systems utilize MPEG-2 transport techniques to deliver digital video over hybrid fiber coaxial architectures. It is well known to those familiar with the art that there are several techniques that are available for delivering program and channel information to the receiving device in order for the receiving device to become aware of what channels currently exist on the network and what programs are associated with those channels. On the in-band path there are two primary protocols; first the Program Specific Information (PSI) data is used to define what services are contained within each multiplexed HFC cable. The PSI data contains several information tables that the receiving device will use to determine the appropriate PID values in which to extract data for each program within the transport stream. These information tables are; Program Association Table (PAT) and Program Map Table (PMT) which are used to correlate specific program numbers within the transport stream to specific PIDs values, such as the video and audio PIDs for the desired video program. The second in-band protocol which is optionally used by cable systems is the Program and System Information Protocol (PSIP). PSIP information defines the programming within an aerial broadcast system and will be modified by CATV provider to reflect the new position of the program as it relates to the frequency distribution within the CATV provider's system as opposed to its original over-the-air location.

Several pieces of information are also distributed to the receiving device via the downstream out-of-band (OOB) path which is used by the receiving device to define the available channels on the network. The first OOB information is Service Information (SI) or Network Information Table (NIT) which provides the virtual channel map information to the receiving device. This table relates program channel numbers to specific distribution frequencies on the cable network. Secondly proprietary data is also delivered OOB to support Electronic Program Guides (EPG) that exists on receiving devices. This information enables the EPG to display an on screen guide that presents to the user all the programs currently available on the network as well as their associated virtual channel numbers. In some cases this proprietary program guide data is delivered via an in-band channel whereby the STB would tune to a specified in-band channel and extract the program data from the MPEG transport stream.

The channel and program data mentioned above is coordinated by the delivery network, as such, it is well known to the delivery network. In addition, as video programs are stored within the mass storage device 31, it should be categorized in such a way as to be consistent with at least one component of the information as it is administered within the media content modification and access system, such as Program Name. By utilizing at least one common element the system can deliver to the mass storage device 31, this common indicator so the head end understands exactly which program the pointer is effectively pointing to.

Figure 13:
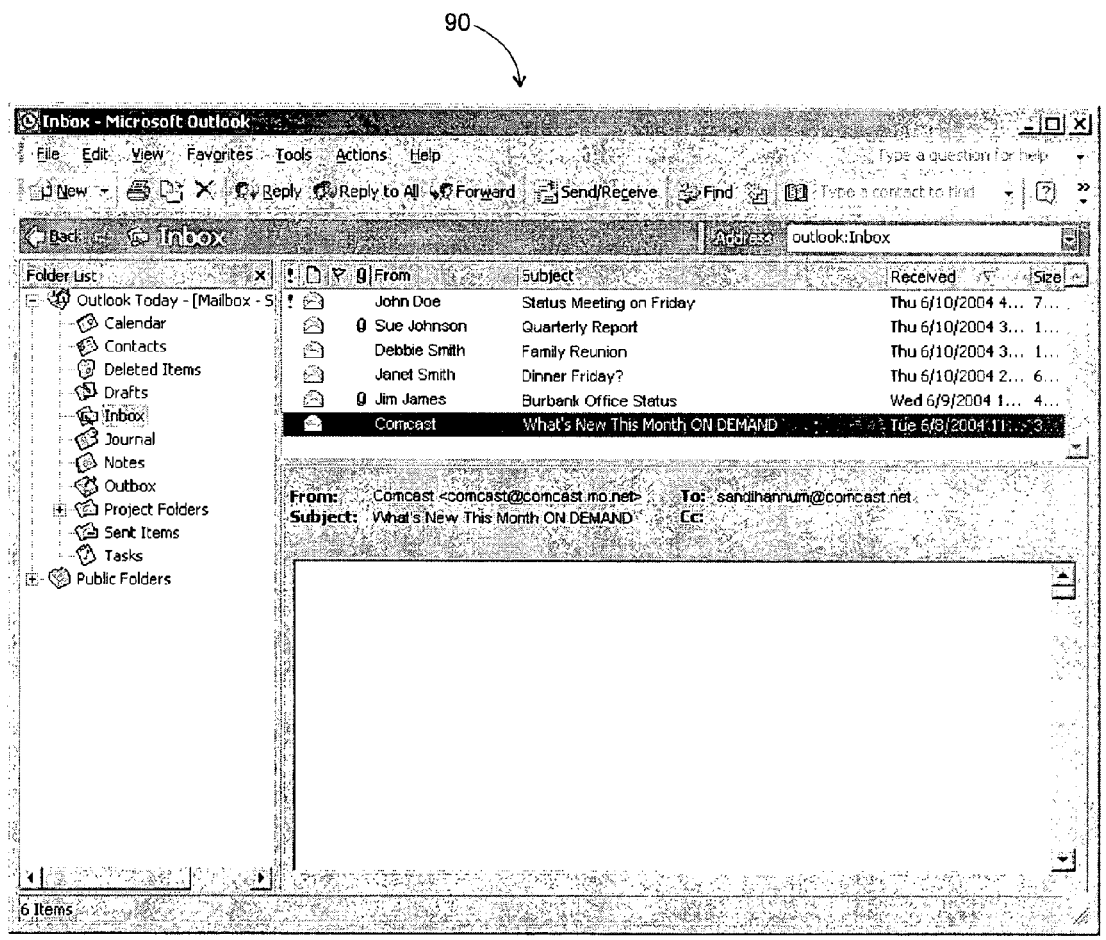
FIG. 13 is a screen view of an exemplary e-mail client having an e-mail message that was received from a CATV provider.
Figure 14:
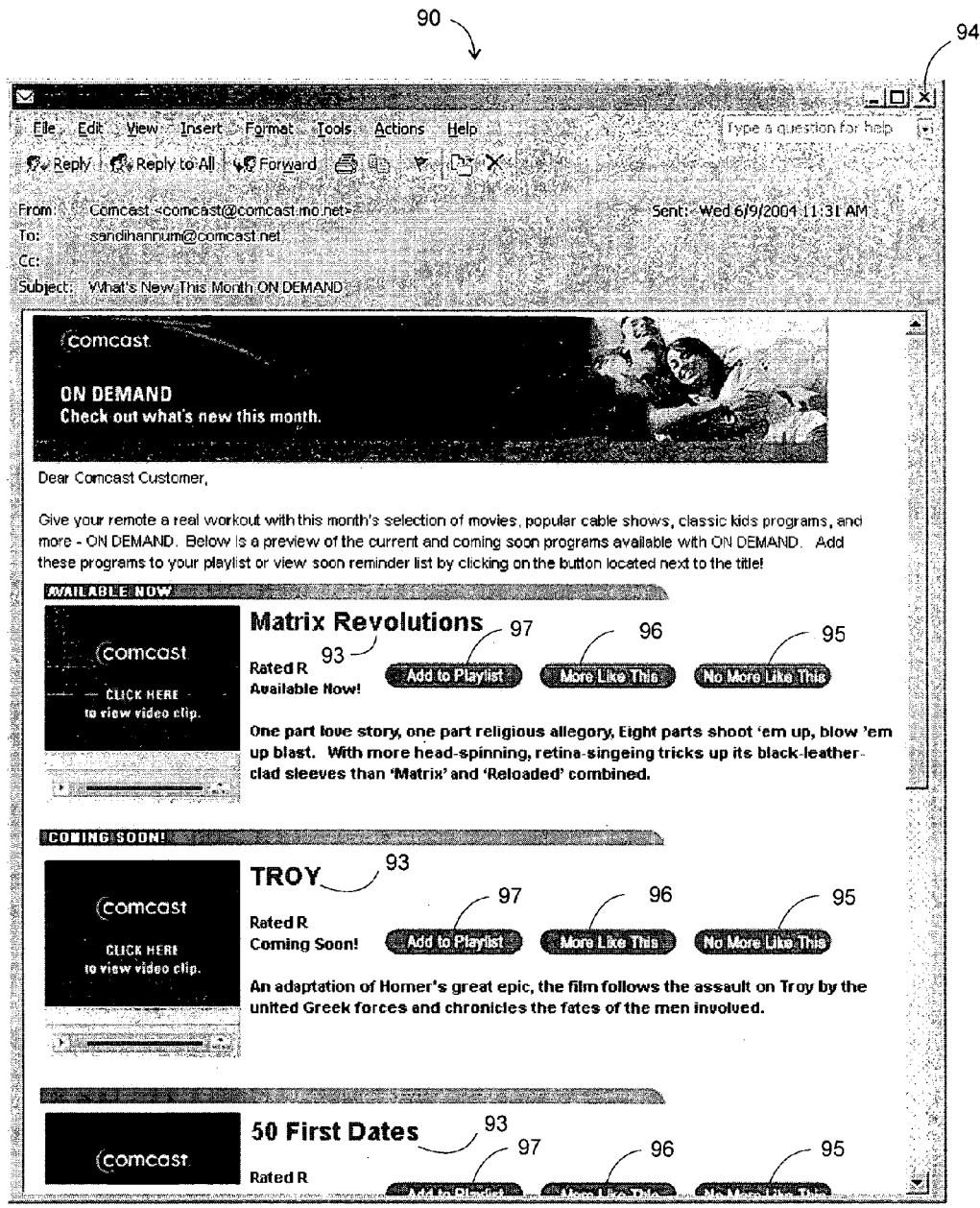
FIG. 14 is a screen view of the exemplary e-mail message of FIG. 13.

A novel feature of the present invention incorporates the ability to add media content to the playlist from disparate consumer electronic display devices. One such example is from an e-mail generation and retrieval mechanism commonly available with computers or other similar devices having a valid connection to the Internet. FIG. 13 shows one such e-mail generation and retrieval mechanism such as a typical e-mail client 90 that may be displayed on a typical personal computer. In the exemplary screen, an incoming message that has been previously sent from a CATV provider is shown available for access within the e-mail client 90. Selecting the particular e-mail message causes the computer to display the entire e-mail message 92 for view by the user such as is shown in FIG. 14. The exemplary e-mail message contains three advertisements 93 of three correspondingly stored types of media content comprising video programs that are offered for view. The user may have the option of doing nothing with the e-mail message by simple deletion thereof by actuation of the deletion button 94. The user may respond by actuating the "NO MORE LIKE THIS" button 95 wherein the CATV provider is instructed to no longer send similar type video programs offerings to the user. However, a "MORE LIKE THIS" actuatable button 96 is also provided, which instructs the system to send more e-mail messages of other media content offerings that are similar to the present advertised media content offering 93. Nevertheless, the user may wish to add the specified pointer of the media content to the playlist by pressing the "CLICK TO ADD TO PLAYLIST" key 97 associated with the particular advertisement. If the "CLICK TO ADD TO PLAYLIST" key 97 is pressed, suitable playlist manipulation means such as an applet is transmitted to the system's user account, which when received, causes a pointer to the stored media content to be automatically added to the user's playlist.

Figure 15:
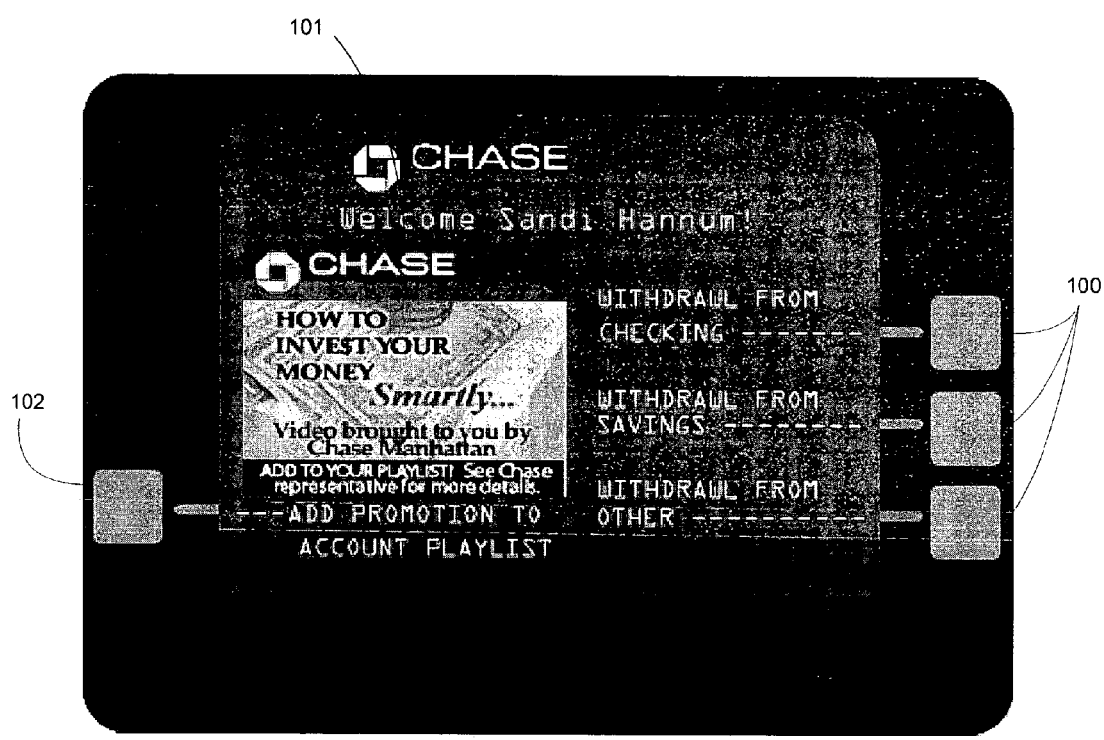
FIG. 15 is a screen view of an exemplary ATM screen having means to add a video program to the playlist of the present invention.

Manipulation of the user's playlist from a distally located disparate device may also comprise an ATM user session of a conventional Automated Teller Machine (ATM). An ATM is generically known as a user interface device which supports cash withdrawals, cash deposits, and other types of services commonly associated with banking services, as well as other non-banking services such as stamp purchase services, lottery ticket purchases, and driver's license renewals. An ATM user session is defined as a user interface that is generated by the ATM, which develops a dialog with the user, for a preferably finite period of time. Access to an ATM user session by the user is limited via a key such as a bank card, and required entry of an authentication scheme such as a password or pass-code that serves to minimize illicit entry into the user session. Given this privileged access, e-mail addresses may be stored within an ATM user account, which allows the ATM to automatically generate messages for addition of media content to the playlist. FIG. 15 shows a typical screen that is displayed during an ATM user session which generally comprises a plurality of banking services 100 available during the session, as well as an advertisement 100 for a proposed media content that may be enticing to the user. An actuatable button 101 is also included, which when pressed, generates an e-mail message with an e-mail address, which is stored in the ATM under the user's account. This e-mail message may comprise executable means such as an applet, such that, when received by the system of the present invention's account, is operable to add the prespecified media content to the user's playlist. Additionally, means may be provided for displaying a cost for the advertised media content, such that upon selection of the media content by the user, the system causes the user's banking account to be automatically debited by the advertised dollar amount.

Figure 16:
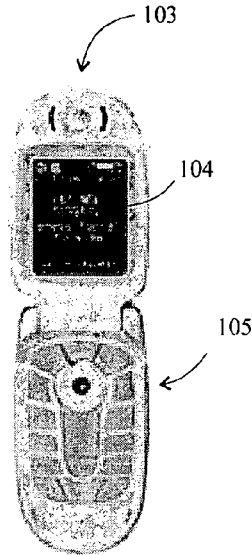
FIG. 16 is a front elevational view of a cellular telephone in accordance with one embodiment described herein.
Figure 17:
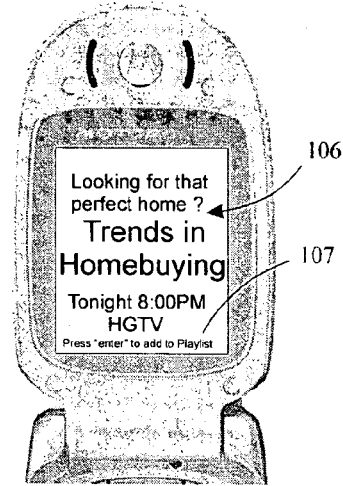
FIG. 17 is a front elevational view of a cellular telephone of the present invention.

Yet another means of manipulation of the user's playlist from a distally located consumer electronics display device, is from a telephone such as a cellular telephone, or Internet enabled telephone that is coupled to the PSTN. FIG. 16 shows a conventional cellular telephone 103 having a display for displaying a media content advertisement. The cellular telephone 103 generally comprises a display 104, and a keypad 105 to facilitate interactive dialog with the user. FIG. 17 shows a partial, enlarged view of the cellular telephone of FIG. 16, wherein the display 104 has a media content advertisement generated thereon. The advertisement 106 may be may be sent by a programming source, CATV provider, or other advertising entity wishing to entice the user into viewing a particular type of media content such as a video program. As shown on the exemplary display, a media content entitled "Trends in Homebuying" is slated for broadcast, on the current day, at 8:00 PM that evening. An additional alpha-numeric prompt 107 is provided which instructs the user how to add the stated video program to the playlist. Should the user decide to select the video program for addition to the playlist, a user destination message is generated that is sent via the PSTN network to the STB at the customer premise. The user destination instant message contains a coding sequence that is operable to instruct the system of the present invention to add a pointer referencing the video program to the user's playlist. Because the present example cites a future video program, the system stores appropriate alertment means into the playlist.

Figure 18:
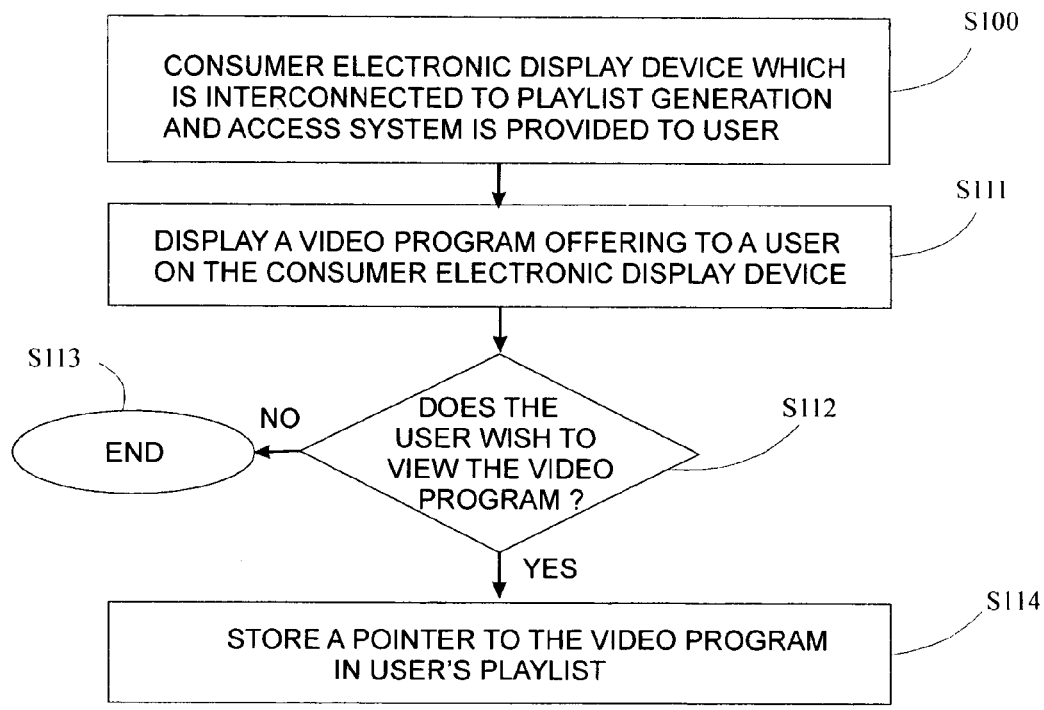
FIG. 18 is a partial, enlarged, front elevational view of the cellular telephone of FIG. 17 showing the display thereof having an advertisement for a yet to be aired video program.

Illustrative steps involved in providing content manipulation means from a consumer electronic display device are shown in FIG. 18. Initially at step S110, a consumer electronic display device is provided to the user, which may be coupled to the video entertainment network via a disparate network such as the Internet or the PSTN. Upon request from an advertising entity, an advertisement for media content such as a video program may be transmitted to the user's consumer electronic display device such that the user is alerted via the display thereof (step 111). At this point, the user is given to option to either choose to select the content for addition to the playlist or merely delete the message from the display (step 112). Should the user elect not to add the content to the playlist, the advertisement may be deleted using any known means (step 113). However, should the user choose to add the content to the playlist, an appropriate button on the user interface is pressed, thereby transmitting a message, which is operable to add a pointer to the associated content to the playlist (step 114).

Thus it can be seen that virtually any consumer electronic display device having interactive capabilities that is interconnected to either the CATV provider's network, the Internet, or the PSTN may be operable to manipulate the user's playlist. The network interface 26 within the STB 13 is capable of deciphering messages that emanate from either network used by the consumer electronic display device. The controller which administers these functions preferably resides in the STB portion of the CATV provider's network in order to maintain full control over content manipulation of the system, as well as to safeguard the user's personal privacy. Using this type of model, unscrupulous marketing thrusts may be minimized via the implementation of conventionally known mechanisms such as firewalls, or virus checking software that serve to block such activity. Given this preferred client-server approach, storage for the playlist is maintained in the optional mass storage means 25 of the STB. Optionally, a client-server model may be implemented wherein the playlist may be stored in the program and database storage 33 of the head end 11 if finite capacity limits of storage 33 permits.

In addition to the ability to modify the system's media content, these consumer electronic display devices may also play media content stored within the system. Given inherent access to the media content system, these consumer electronic display devices would also be able to issue the proper messaging protocol to initiate play of an associated stored media content pointer on the display thereof. For example, a user may wish to view a type of media content comprising an eMagazine, wherein the eMagazine contains a plurality of photographs of homes for sale within a particular region. Thus, a user having immediate access to a disparately interconnected consumer electronic display device such as a telephone, smart watch, Internet enabled telephone, video telephones, personal digital assistant (PDA) or laptop computer may interactively view real estate listings that have been stored in the system.

In addition to a user modifiable playlist, the system of the present invention provides other services that serve to maximize the functionality thereof. These services comprise an interactive traffic monitor 110, an e-mail client 130, an auction monitoring tool 140, an interactive weather monitor 150, an EPG, and a sub-user configuration tool 60. Each of these services may access pertinent media content from either the CATV provider's network, the Internet, or via the PSTN, wherein this functionality is made possible via the aforedescribed network interface using transmission mediums such as a DOCSIS version medium which are well known in the art. A complete description of each of these services are described hereinbelow.

Figure 19:
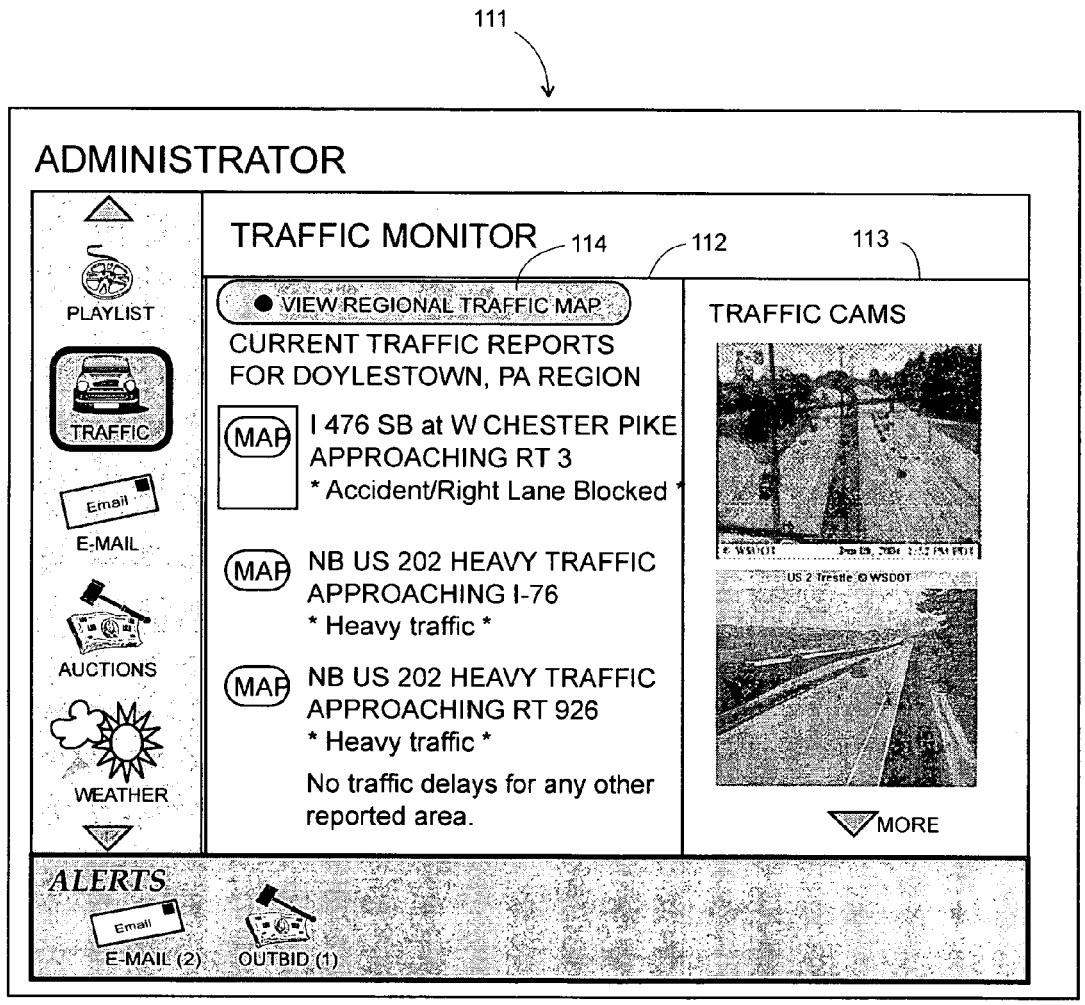
FIG. 19 is an exemplary illustration showing the resultant screen view upon actuation of the 'TRAFFIC' service icon.
Figure 20:
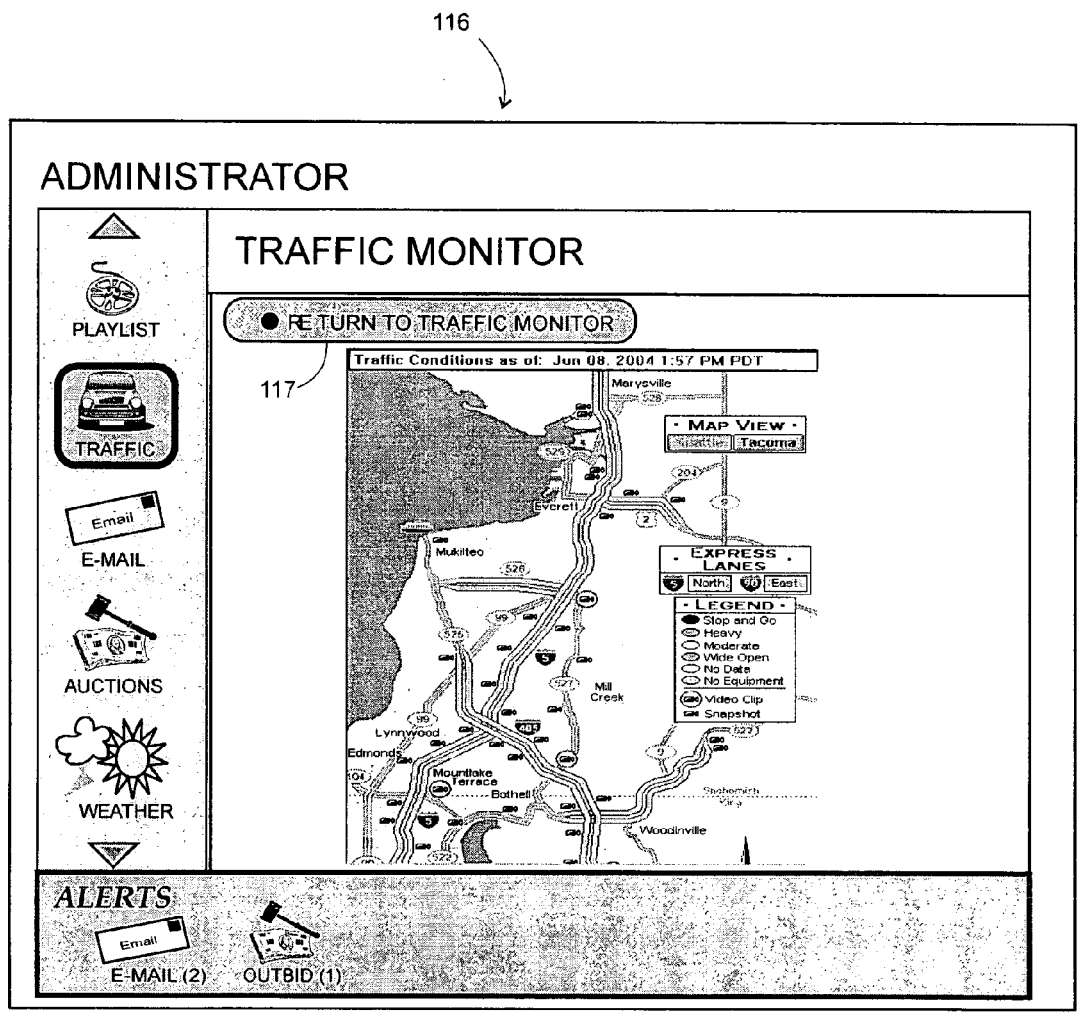
FIG. 20 is an exemplary illustration showing the traffic map screen of the present invention.

As best shown in FIG. 6, disposed beneath the playlist icon 45 in the services selection column 44 is a traffic icon 110. In response to an actuation of the traffic icon 110 by the user, a traffic monitor screen 111 will be generated on the display as shown in FIG. 19. The exemplary traffic monitor screen 111 comprises the services selection screen 44, two additional columns defining a first weather information column 112, and a second weather information column 113 disposed to the right thereof that provide pertinent traffic information. Disposed beneath the services selection screen 44, as well as the first and second weather information columns (112, and 113), is the alertment frame 50 which provides instantaneous alerts for the user such as recently received e-mail messages, instant messaging, or current auction status. The first weather information column 112 may provide textual or graphical information regarding the current status of driving conditions within any metroplex. The second column 113 may provide other pertinent information regarding current traffic conditions, wherein an exemplary second column is shown displaying traffic cam media content. Nevertheless, it is to be appreciated that the weather information may be provided to the user in any suitable format; the aforedescribed weather information including a two column display having textual and graphical information is only for the purpose of providing an example of one means of formatting weather information to a user. Additional weather information may be provided via an actuatable button 114 disposed on the screen, wherein actuating said button causes the controller to generate a traffic map screen as shown in FIG. 20. The traffic map screen 116 comprises a map of the major roadways of the aforementioned metroplex having icons or other similar indicative means for informing the user of current traffic problems thereon. In the upper, left corner of the screen is an actuatable button 117 for returning back to the main traffic monitor screen 111. Again, it is to be appreciated that many other screens may be used in conjunction with the traffic monitor screen, the exemplary example of the traffic map screen merely shows one example of implementing multiple traffic information screens with the present invention.

Figure 21:
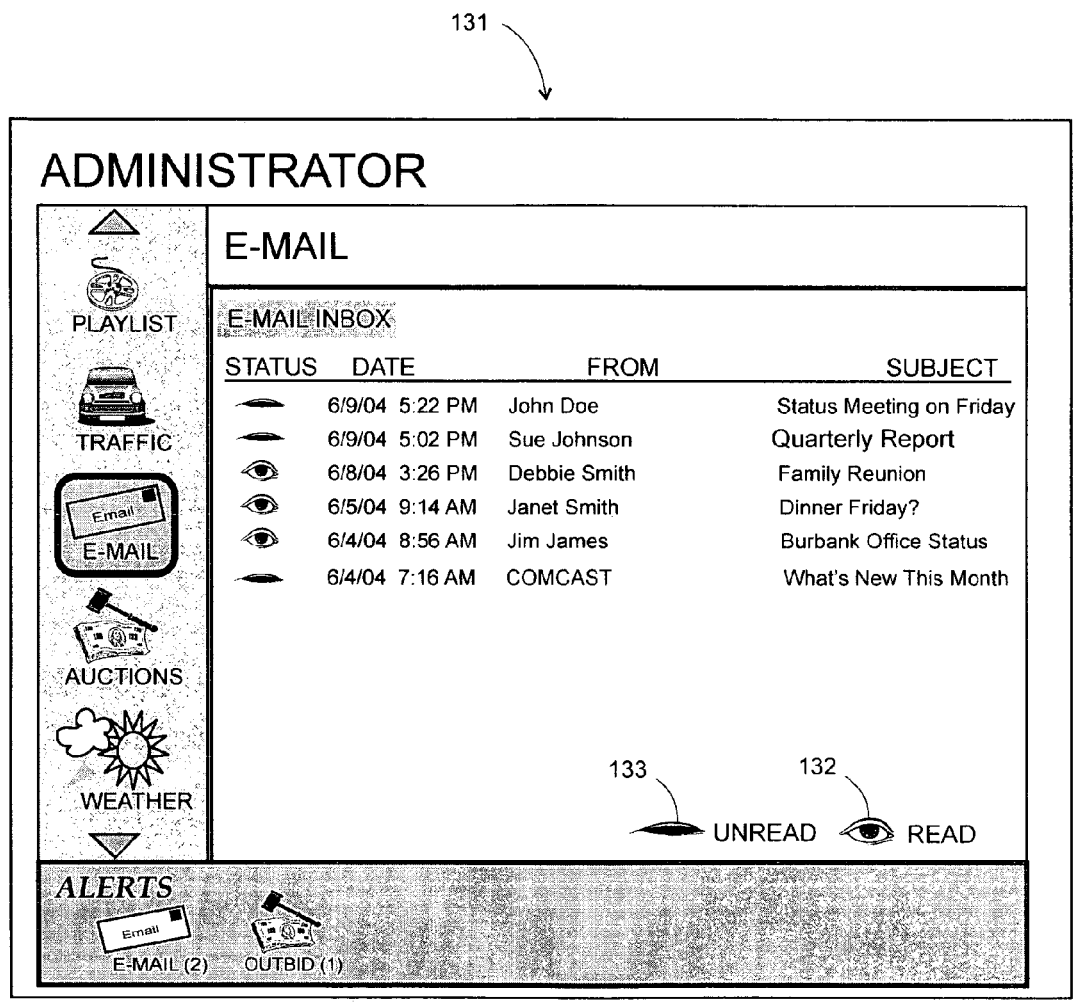
FIG. 21 is an exemplary illustration showing the resultant screen view upon actuation of the 'E-MAIL' service icon.
Figure 22:
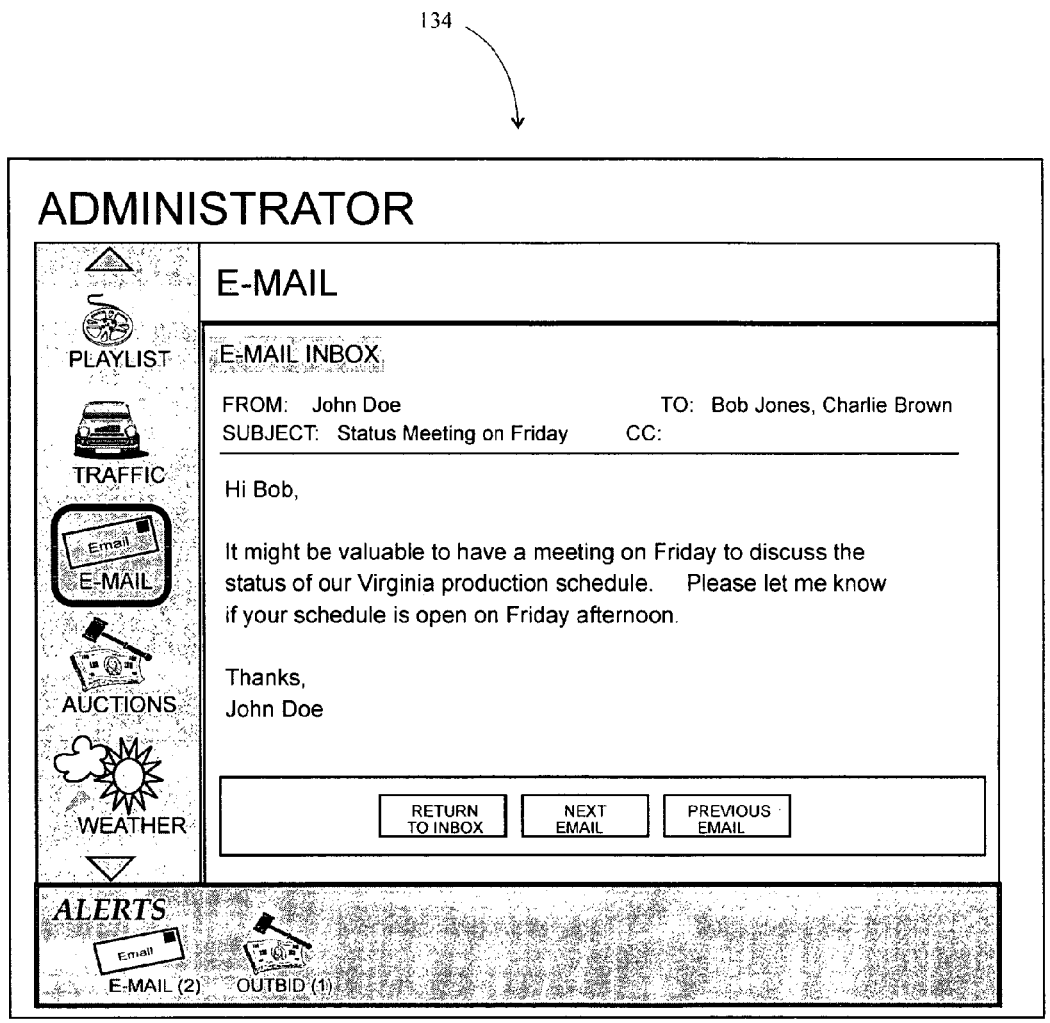
FIG. 22 is an exemplary illustration showing an e-mail message that was accessed from the 'E-MAIL' service icon.
Figure 23:
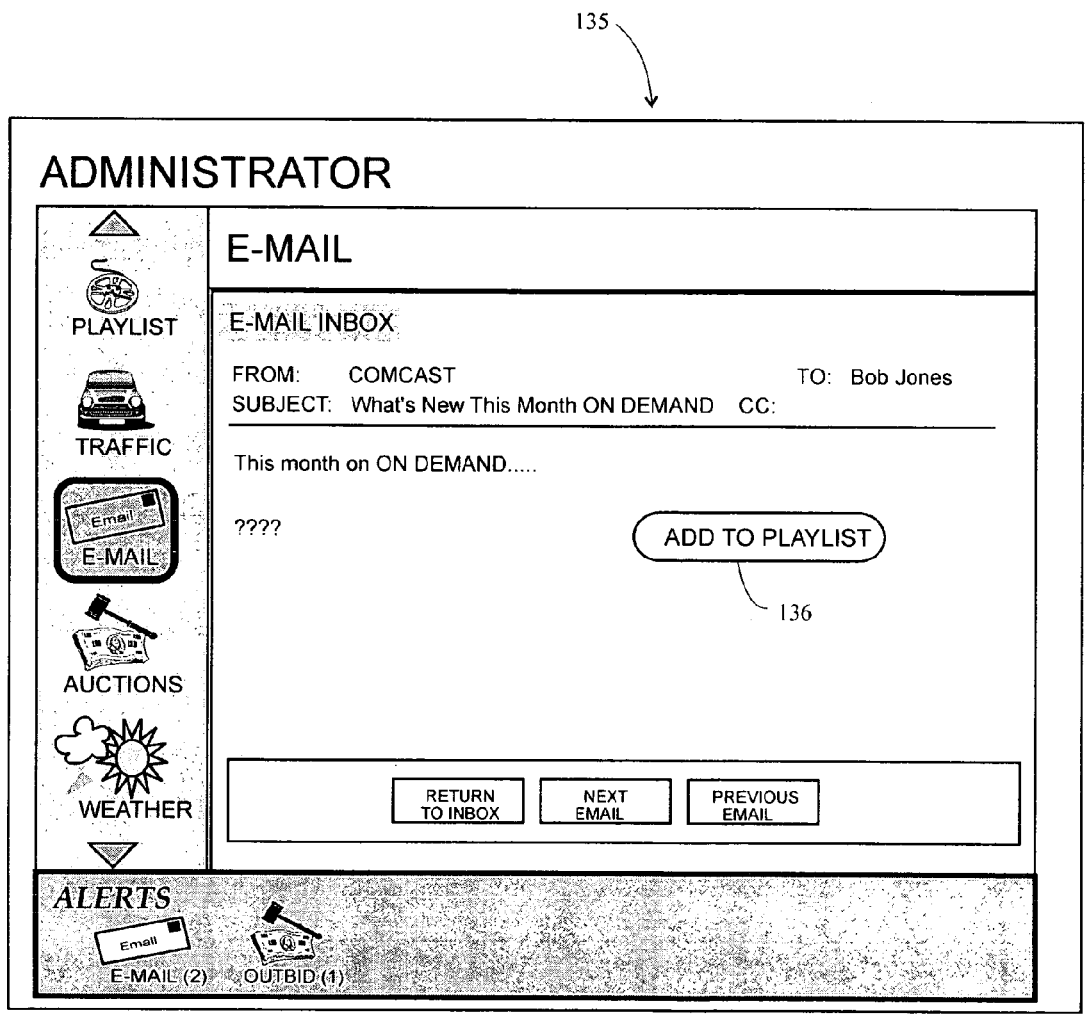
FIG. 23 is an exemplary illustration showing an e-mail message that was accessed from the 'E-MAIL' service icon having an actuatable button for addition of a particular video program to the playlist.

Underneath the traffic icon 110 is an actuatable button within the serves selection column that is labeled as an e-mail icon 130. Actuation of the e-mail icon 130 by the user results in an e-mail client screen 131 being generated on the display such as shown in FIG. 21. The exemplary e-mail client screen shows a total of six rows of information comprising six e-mail messages which are resident within the user's account. In the leftmost region of each row is either a read icon 132 or an unread icon 133 that indicates to the user, whether the corresponding e-mail message has been read or not. Each row lies within an unseen, actuatable region, which when actuated by the user, causes the controller to generate a e-mail message screen comprising actual text or graphics contained in the e-mail message, wherein FIG. 22 shows an exemplary e-mail message screen 134 that resulted in response to a press of the uppermost row of the e-mail client screen 131. Additionally, media content such as video programs may be added to the playlist via an e-mail message in a similarly hereinbefore described manner, wherein an actuatable button is included in the e-mail message. If the user actuates the lower-most row of the e-mail client screen 131, an e-mail message 135 is generated as shown in FIG. 23. The e-mail message contains an actuatable button 136, which when pressed, causes the controller to store the corresponding media content to the user's playlist.

Figure 24:
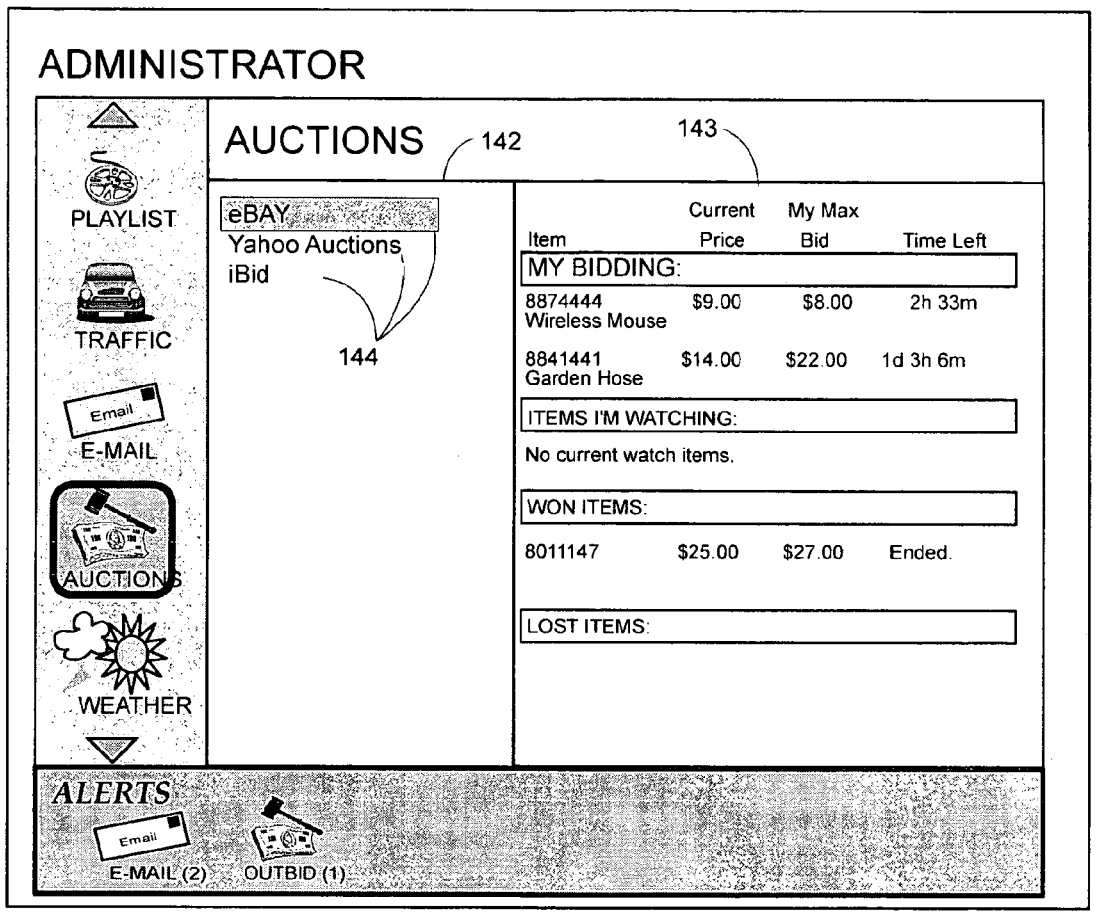
FIG. 24 is an exemplary illustration showing the resultant screen view upon actuation of the 'AUCTION' service icon.

Disposed beneath the e-mail icon 130 is an actuatable auction icon 140, which is actuatable by a user for accessing the current bid status of several online auction entities. FIG. 24 shows an exemplary auction screen) 41 that is generated by the controller in response to an actuation of the auction button 140 by the user. The auction screen generally comprises the services selection column 44, and the alertment frame 50, which is similar to the previous service screens. Additionally, the auction screen includes two columns defining an auction venue column 142, and a personal auction information column 143 that exhibits pertinent auction information specific to the user. The auction venue column may contain a plurality of actuatable buttons 144, each defining specific auction venues that are commonly available on the Internet. Due to an actuation of either button 144, the personal auction information column 143 may be generated with textual information that indicates the current status of ongoing bids that the user has placed previously with the aforementioned auction venue. The user may also monitor the bid status of other auction venues by actuating the appropriate button 144 in the auction venue column in order to access pertinent the bidding status from within those venues. The aforedescribed auction screen is not intended to be limiting in the sense that only those features described are known by the applicant, rather the foregoing description merely shows one sample embodiment of an auction monitoring system that may be implemented with the system of the present invention.

Figure 25:
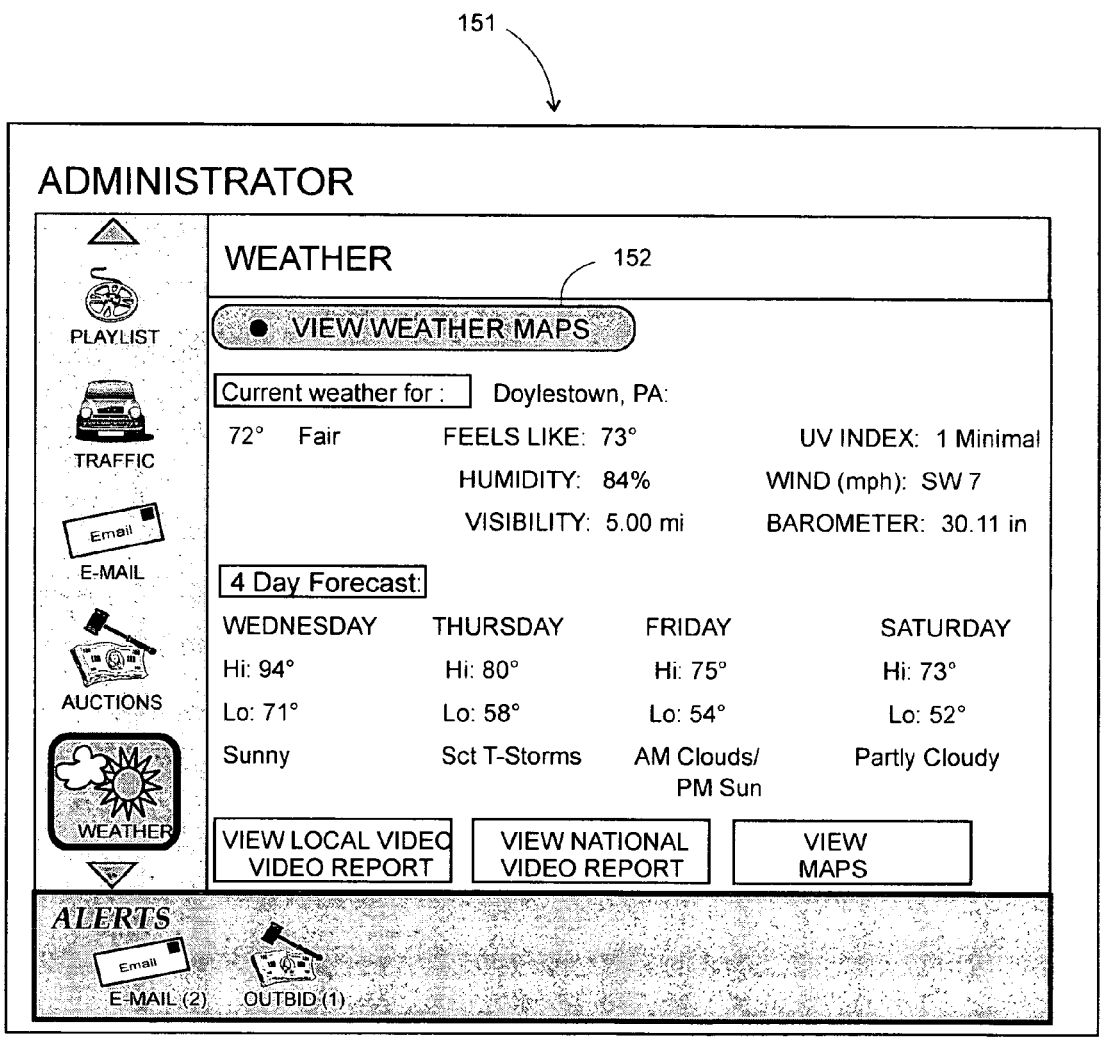
FIG. 25 is an exemplary illustration showing the resultant screen view upon actuation of the 'WEATHER' service icon.
Figure 26:
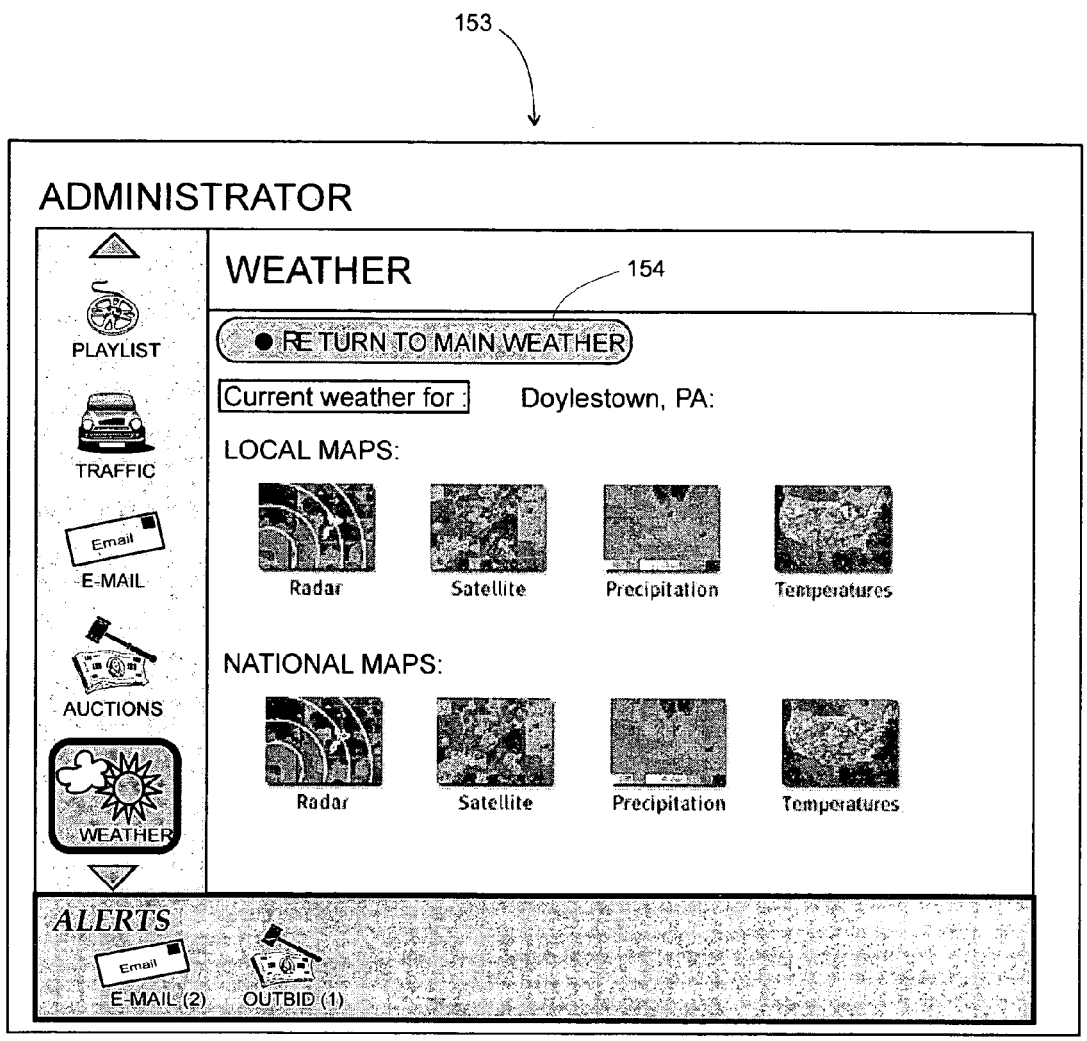
FIG. 26 is an exemplary illustration showing the weather map screen that was accessed from the 'WEATHER' service icon.

Yet another service that is provided within the service selection column 44 of the present invention is a weather service button 150 that is disposed directly beneath the auctions button 140. FIG. 25 shows an exemplary main weather screen 151 that is generated by the system in response to an actuation of the weather button by the user. As shown, the main weather screen contains information regarding current and forecast weather pertinent to the user's demographic region. An actuatable weather map icon 152 is also provided that allows the user to access pertinent weather information in a graphic form relating to the user's demographic region. FIG. 26 shows an exemplary weather map screen 153 that is generated by the controller in response to an actuation of the weather map icon 152. Another actuatable main weather icon 154 is provided on the weather map screen in order to enable interactive movement back to the main weather screen.

The traffic, e-mail, auction, and weather services all provide the user with informative media content that may be obtained from a viable Internet connection that is preferably enabled via the service provider gateway 16, which is compatible with multiple disparate networks and uses a protocol such as a version of the DOCSIS network infrastructure. The controller portion of the system is operable to read incoming video programming, Internet, or telephony packets and route appropriate requests, and responses to these requests to all of the services offered by the system. Optionally, the interactive traffic, e-mail, auction, and weather media content may be maintained within video server 30 portion of the head end 11 of a typical CATV provider network for access thereby. Thus, the head end II may have an internally configured gateway device, which serves to access pertinent information from the Internet or from the PSTN. Yet another viable option contemplated by the applicant would be to provide a conventional phone line (RJ-11) connection and/or Internet enabling means (Ethernet) connection directly to the STB in order to enable PSTN services and/or Internet services thereto. Thus the controller would also incorporate gateway functionality by serving requests, and responding to requests to the CATV network, Internet, and PSTN in order to implement the aforedescribed functionality.

The present invention may be embodied in other specific forms without departing from the spirit or scope of the invention. For example, the aforedescribed embodiment discloses one example whereby a DRM system is implemented in order to provide Pay-Per-View™ services. However it is to appreciated that the user account enabled media content modification and access system of the present may be expanded to include virtually any type of media content that may be controlled using conventional DRM techniques. One examples of another DRM enabled service that may be implemented with the present invention includes banking services. Additionally, other types of media content may be adapted for implementation with the present system including music, books, eMagazines, and the like. Thus, the described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
   accessing, by a computing device, a playlist comprising a plurality of media content pointers, wherein each of the plurality of media content pointers is associated with corresponding media content, and wherein at least one media content pointer of the plurality of media content pointers is associated with a video program that is scheduled to be multicast at a future scheduled multicast time;
   causing output of an alert at a time period before the future scheduled multicast time of the video program;
   receiving, from an interactive device, user input comprising an instruction to add or delete one or more of the plurality of media content pointers from the playlist, wherein the instruction comprises information that indicates that a user responded positively to a first media content offering; and responsive to receiving the information, transmitting, to the interactive device, a message indicating a second media content offering;
   wherein content of the second media content offering and content of the first media content offering have characteristics that satisfy a similarity threshold; and
   wherein the second media content offering is different from the first media content offering.

2. The method of claim 1, further comprising:
transmitting, to the interactive device, information regarding the first media content offering for display by the interactive device,
wherein the first media content offering comprises an offer to provide the content of the first media content offering.

3. The method of claim 2,
wherein the interactive device comprises a telephone, and
wherein at least a portion of information transmitted to the telephone is transmitted through a public switched telephone network.

4. The method of claim 1, further comprising:
receiving, from the interactive device, different user input indicating that the user did not respond positively to the second media content offering; and
in response to receiving the different user input, storing information to prevent a message indicating a third media content offering from being sent to the user, wherein the content of the second media content offering and content of the third media content offering have characteristics that satisfy the similarity threshold.

5. The method claim 1, wherein a first pointer of the plurality of media content pointers comprises a uniform resource locator, wherein a second pointer of the plurality of media content pointers comprises a tag associated with a channel from which a video program associated with the second pointer will be multicast, and wherein the tag is associated with a scheduled multicast time of the video program associated with the second pointer.

6. The method of claim 1, further comprising:
transmitting media content in a format being operable to play on a display associated with the interactive device.

7. The method of claim 1, wherein the user input is included in a message.

8. The method of claim 1, wherein the second media content offering comprises an object that, when selected, adds a pointer for accessing the content of the second media content offering to the playlist.

9. A method comprising:
accessing, by a computing device, a playlist on a first network, the playlist comprising a plurality of media content pointers, wherein each of the plurality of media content pointers is associated with corresponding media content, and wherein at least one media content pointer of the plurality of media content pointers is associated with a video program that is scheduled to be multicast at a future scheduled multicast time;
causing output of an alert at a time period before the future scheduled multicast time of the video program;
transmitting, to an interactive device connected to the first network, a first media content offering;
receiving, from the interactive device, user input indicating that a user responded positively to the first media content offering; and
responsive to receiving the user input, transmitting, to the interactive device, a message indicating a second media content offering;
   wherein content of the second media content offering and content of the first media content offering have characteristics that satisfy a similarity threshold; and
   wherein the second media content offering is different from the first media content offering.

10. The method of claim 9, further comprising:
receiving, from the interactive device, different user input indicating that the user did not respond positively to the second media content offering; and
in response to receiving the different user input, storing information to prevent a message indicating a third media content offering from being sent to the user, wherein the content of the second media content offering and content of the third media content offering have characteristics that satisfy the similarity threshold.

11. The method of claim 10, further comprising:
transmitting, to a controller via the first network, electronic signals operable to add or delete one or more media content pointers from the playlist.

12. The method of claim 9, wherein the interactive device is interconnected to a disparate network platform.

13. A method comprising:
accessing, by a computing device, a playlist comprising a plurality of media content pointers, wherein each of the plurality of media content pointers is associated with corresponding media content, and wherein at least one media content pointer of the plurality of media content pointers is associated with a video program that is scheduled to be multicast at a future scheduled multicast time;
causing output of an alert at a time period before the future scheduled multicast time of the video program;
receiving, from an interactive device, user input comprising an instruction to add or delete one or more of the plurality of media content pointers from the playlist, wherein the instruction comprises information that indicates that a user did not respond positively to a first media content offering; and
responsive to receiving the information, storing information to prevent a message, indicating a second media content offering for content, from being sent to the user, wherein the content of the second media content offering and content of the first media content offering have characteristics that satisfy a similarity threshold.

14. A method comprising:
storing, by a computing device, a playlist on a storage device of a first network, the playlist comprising a plurality of media content pointers configured to be modified by a user from an interactive device, wherein each of the plurality of media content pointers is associated with corresponding media content, and wherein at least one media content pointer of the plurality of media content pointers is associated with a video program that is scheduled to be multicast at a future scheduled multicast time;
causing output of an alert at a time period before the future scheduled multicast time of the video program;
transmitting, to the interactive device, a first media content offering, wherein the interactive device is connected to the first network;
receiving, from the interactive device, user input indicating that the user did not respond positively to the first media content offering; and
responsive to receiving the user input, storing instructions to prevent a message, indicating a second media content offering for content, from being sent to the user, wherein the content of the second media content offering and content of the first media content offering have characteristics that satisfy a similarity threshold.

* * * * *

UNITED STATES PATENT AND TRADEMARK OFFICE
CERTIFICATE OF CORRECTION

| | |
|---|---|
| PATENT NO. | : 9,563,702 B2 |
| APPLICATION NO. | : 12/683232 |
| DATED | : February 7, 2017 |
| INVENTOR(S) | : Hannum et al. |

It is certified that error appears in the above-identified patent and that said Letters Patent is hereby corrected as shown below:

In the Drawing

Sheet 6 of 22, FIG. 8, Reference Numeral 40:
Please delete "40" and insert --70--

Sheet 12 of 22, FIG. 14, Reference Numeral 90:
Delete "90" and insert --92--

Sheet 20 of 22, FIG. 24:
Insert --141-- at top of figure

In the Specification

Column 3, Line 15:
Delete "hierarchal" and insert --hierarchical--

Column 11, Line 36:
Delete "60" and insert --10--

Column 11, Line 37:
Delete "50" and insert --44--

Column 17, Line 30:
Delete "screen) 41" and insert --screen 141--

Signed and Sealed this
Eleventh Day of October, 2022

Katherine Kelly Vidal
*Director of the United States Patent and Trademark Office*